US005842441A

United States Patent [19]

Gjerløv

[11] Patent Number: 5,842,441
[45] Date of Patent: Dec. 1, 1998

[54] MEDICATED AND INDIVIDUALIZED TREATMENT SHAMPOO FOR DERMATOLOGICAL DISTURBANCES OF COMPANION ANIMALS

[75] Inventor: Mogens E. Gjerløv, Kolding, Denmark

[73] Assignee: Pharmalett Denmark A/S, Denmark

[21] Appl. No.: 703,027

[22] Filed: Aug. 26, 1996

[51] Int. Cl.$^6$ .......... A01K 29/00
[52] U.S. Cl. .......... 119/650
[58] Field of Search .......... 119/651, 650

[56] References Cited

U.S. PATENT DOCUMENTS

| | | | |
|---|---|---|---|
| 3,740,026 | 6/1973 | Wilke | 366/190 |
| 3,997,080 | 12/1976 | Langstroth | 222/61 |
| 4,068,781 | 1/1978 | Toth | 222/52 |
| 4,294,728 | 10/1981 | Vanlerberghe et al. | 252/542 |
| 5,078,459 | 1/1992 | Sclater | 312/45 |
| 5,163,010 | 11/1992 | Klein et al. | 364/479 |

OTHER PUBLICATIONS

Muller, et al., Small Animal Dermatology, Fourth Edition (1989) pp. 152–166, 169–172.

"Principles of Shampoo Therapy" (date unknown, but before fling date of present application).

Dunstan, "Anatomy and Physiology: Structure and Function of Skin", Skin Diseases of Dogs and Cats, (1994) pp. 15–25, 52.

Melman, "Shampoo Therapy", Skin Diseases of Dogs and Cats (1994) pp. 53–60.

*Primary Examiner*—Edgar Burr
*Assistant Examiner*—Daniel J. Colilla
*Attorney, Agent, or Firm*—Zarley, McKee, Thomte, Voorhees & Sease

[57] ABSTRACT

A system for customized provision of medicated shampoos which are individualized for treatment of specific dermatological disturbances of specific and individual companion animals. The method according to the invention involves diagnosing the dermatological disturbance and then adding to a pre-mixed base shampoo a pre-mixed, medically effective amount of concentrate correlated to the particular dermatological disturbance, and then the composition is provided to the owner of the animal. According to another aspect of the invention, a kit apparatus is provided to carry out the method. According to a further aspect of the invention, packaging for shipment and display of the apparatus is provided.

11 Claims, 11 Drawing Sheets

MEDICATED AND INDIVIDUALIZED TREATMENT SHAMPOO FOR DERMATOLOGICAL DISTURBANCES OF COMPANION ANIMALS

FIELD OF THE INVENTION

The present invention relates to the field of medicated shampoos, particularly medicated shampoos individualized for treatment of dermatological disturbances of specific and individual companion animals.

BACKGROUND OF THE INVENTION

As used herein, the term "companion animals" refers to animals commonly domesticated by people and used as companionship pets. This could include, for example, dogs and cats, but otherwise may also include more exotic pets. Such companion animals frequently may develop various skin conditions that affect the appearance of their skin and hair. These disturbances, which may affect skin and hair, can range from pathological conditions of the skin, to fungal infections of the skin, to hyperkeratosis (cornification), to dramatic hair loss, to keratolysis (dissolving or peeling of the keratin from the epidermis), and to other conditions such as pruritus (intense and persistent itching). Those listed here are not intended to be all inclusive, but only illustrative. The many different possible skin conditions that may frequently occur with companion animals often create stress on the part of the pet owner. Put another way, the pet owner becomes disturbed over the appearance changes and apparent distress caused to the companion pet animal. Frequent occurrences of such skin disturbances often results in the pet being taken to the veterinarian.

The veterinarian may prescribe a prescription shampoo containing some medications. However, the problem is that such prescription shampoos are generally made for generalized treatment of skin disorders, without any particular tailoring of the formulation to any specific skin disorder. As a result, while some of the medicated shampoos are effective for certain specific treatments, none have the ability to be customized or tailored for specific treatment for individual skin disturbances of any particular pet.

The present state of the art also is therefore deficient in the treatment of such dermatological problems in companion animals because it is difficult or near impossible to customize a treatment for each animal. True customization for different dermatological problems for each different animal would entail mixing different treatment compositions with ingredients that specifically address the dermatological problem. Such specific laboratory formulation from scratch each time, without any standardized apparatus, instructions, or guidance, would be time-consuming and beyond the knowledge of most practicing veterinarians. It would also be impractical with respect to the necessity of having a wide variety of ingredients available and in inventory.

Accuracy of dosage is also a significant consideration. In a true from scratch laboratory formulation, without any instruction or guidance, the person mixing the specific medicated shampoo must either find references for quick guidance, or take it upon themselves to decide on the required dose amounts and concentrations of each component. Still further, mixing from scratch at the clinic brings into consideration the efficiency of use of resources. There is no pre-packaging or pre-design of dosages. Trial and error comes into play with the result of waste of time and materials. Specific shampoo tailoring is therefore simply not done with any regularity. Therefore, this complex situation needs a better solution in the art. That needed solution includes the need for efficient and economical production, packaging, shipment, and storage of components for the system. Moreover, there is a need for efficient guidance and labeling to facilitate the entire system.

There is, therefore, a continuing and real need for the development of customized or tailor-made medicated shampoos, with the shampoo itself designed for treatment of a specific companion pet, after that pet has been properly diagnosed. This invention has as an object fulfillment of this need.

Another objective of the present invention is to provide such a customized medicated shampoo as described above.

Yet a further objective of the present invention is to provide a customized and medicated shampoo system which can be individualized for treatment of dermatological disturbances of particular pet animals without having to individually formulate the entire shampoo systems for each animal.

A yet further objective of the present invention is to provide a particular and individualized treatment of dermatological disturbances of companion animals which can be conveniently prescribed, after companion animal epidermological diagnosis, without having to start from "scratch", so to speak, with each creation of each shampoo system.

Still another object of the present invention is to provide a shampoo system kit that can be individualized after diagnosing specific companion animal skin disturbances.

A yet further object of the present invention is to provide a packaging system for a particularized and individualized treatment of dermatological disturbances of companion animals through use of customized medicated shampoos.

Additional objects of the present invention include:

a method of manufacturing and packaging a system such as the above-described one, which includes multiple interrelated components;

a method of manufacturing and packaging which is efficient in its utilization of resources and economical in its use of materials;

a packaging of multiple components that is durable to deter spillage or breakage during shipment;

a packaging system that allows quick and durable conversion of shipping containers to display holders;

a system of packaging which allows shipment of multiple containers to one location to enable that location to have multiple dosages of ingredients and containers available for many different customers;

use of components of the system, each of which is easy to operate and accurate in dispensation of dose as well as efficient in containment of ingredients; and a system of integrated instructions, guides, multiple dosage medications and a base shampoo all of which can accurately and efficiently be dispensed and presented to multiple customers.

The method and manner of accomplishing each of the above objectives will become apparent from the following detailed description of the invention.

SUMMARY OF THE INVENTION

This invention relates to an individualized treatment shampoo system for dermatological disturbances of companion animals which provides a customized medicated shampoo for each individual animal after diagnosing the companion animal's skin and hair condition. The invention also relates not only to the shampoo system, but also to a method and kit providing the shampoo system, and to a packaging for the system and its individual parts.

According to another aspect of the invention, certain constructional and instructional elements of the system cooperate to provide an advantageous system for customized medicated shampoo compositions for individual animals. Such features include display holders for multiple containers that include labels to be placed on the containers, or which present the containers in positions correlated to indicia which can be used to place information on the label to identify the constituent ingredients in the containers sold to the customer, and to uniform dispension of doses.

BRIEF DESCRIPTION OF THE DRAWINGS

The present invention may be more fully understood with reference to the drawings which are illustrative only and in no way intended to be limiting.

DETAILED DESCRIPTION OF THE INVENTION

Figure 1:
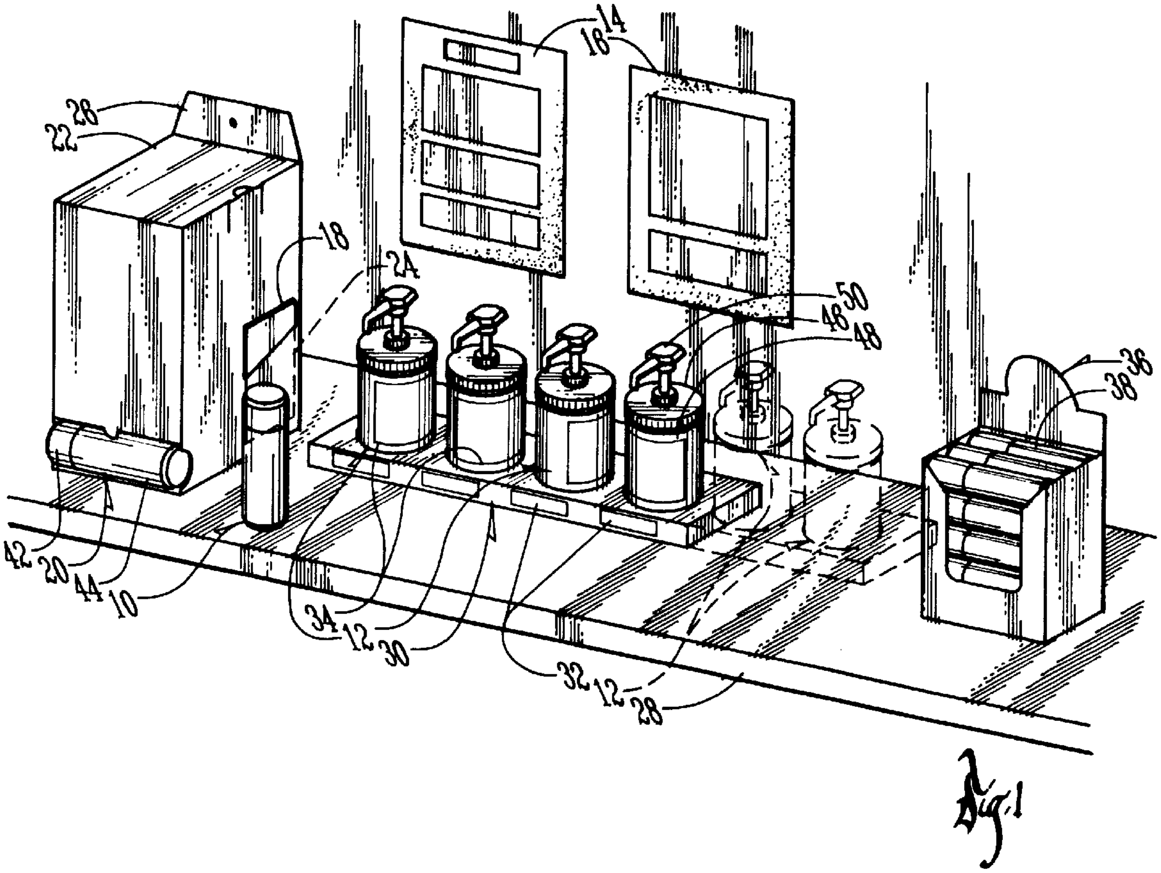
FIG. 1 is a perspective view of a kit of components according to a preferred embodiment of the present invention.

For a better understanding of the invention, the preferred embodiments of the invention will now be described in detail. Frequent reference will be taken to the drawings which are described immediately above. Reference numbers will be used throughout this detailed description to refer to certain parts and locations in the drawings. The same reference numbers will be used to indicate the same parts and locations throughout the drawings, unless otherwise stated.

A. Overview

FIG. 1 illustrates a preferred embodiment of a customized medicated shampoo system according to the present invention. The veterinarian or other facilitator of the system of FIG. 1 will ultimately provide to the pet owner or customer a labeled prescription shampoo bottle 10 containing a customized mixture of a pre-mixed base shampoo with a selected use of medicated pre-mixed concentrate specifically selected as a result of diagnosis of a companion animal's skin and hair condition. Bottle 10 and its contents are prepared as a result of the interaction of the components of FIG. 1. Those components include a plurality of medicated concentrate dispensers 12, instruction and guidance sheets 14 and 16, a plurality of bottle labels 18, and a supply of bottles 20 containing a quantity of pre-mixed base shampoo. In this description, reference number 10 refers to a bottle that is ready to give to the customer, including a filled-out label, base shampoo, and the selected medicated concentrate (s). Reference number 20 will refer to bottles having no label and containing only a pre-measured amount of base shampoo.

FIG. 1 also illustrates that the supply of bottles 20 can be housed in bottle dispenser 22, which stores a plurality of bottles 20, each containing a pre-measured amount of pre-mixed base shampoo. Dispenser 22 also provides for easy dispension of individual bottles 20 which can then be processed into the final customized shampoo in bottle 10. Dispenser 22 includes a built-in label holder 24 for easy access to labels that can be permanently attached to final shampoo bottle 10 once it is prepared to present to the customer.

Dispenser 22 can also include a wall attachment 26 to allow the entire dispenser to be hung from a wall. Alternatively, it can sit on a supporting surface 28, such as is shown in FIG. 1. FIG. 1 package 22 is shown as an illustrative packaging only. The invention is not limited to what is depicted at 22. For example, it could also be a package with vertical dividers and bottles 20 stacked one upon another so that they can be removed by pulling out one bottle 20 from its cap end and so as a result another bottle 20 descends by gravity feed into position. Other dispenser containers 22 could also be used such as a simple box with a removable lid.

Concentrate dispensers 12 can be removably positioned in a display holder 30. In FIG. 1, holder 30 is shown relative to four dispensers 12. Broken lines show that holder 30 could be configured to display and hold any number of dispensers 12 according to desire. Indicia 32 can be placed on holder 30 to distinguish each of the locations in holder 30. A label or indicia 34 can be placed on each dispenser 12 to distinguish it from other dispensers 12 and/or to indicate the contents of each of dispensers 12.

Instruction sheets 14 and 16 can include printed matter or indicia which can be used with the other components of the system of FIG. 1, such as will be described later.

An optional feature of the system of FIG. 1 includes a display holder 36 which includes multiple supplementary containers 38. An example would be a humectant that could be used, for example, in a rinse after use of the shampoo and concentrate(s) mixture. Other possible supplementary substances are possible. Indicia can be included on containers 38 and/or display holder 36 (not shown) as needed or desired. This likewise would be true of bottle dispenser 22.

A detailed description of the preferred embodiment of the contents of the base shampoo and concentrates of dispensers 12 will now be set forth.

B. Base Shampoo and Concentrates

The total weight of the customized medical shampoo composition of the present invention is typically comprised of from about 0.1% by weight to about 35% by weight of each active medicated concentrate, preferably from about 0.2% by weight to about 15% by weight of each medicated active concentrate in an aqueous detergent-based shampoo.

The aqueous based detergent shampoo may typically contain from about 5% to about 60% of a cleansing detergent. The detergent can be anionic, amphoteric, or cationic, although anionic organic detergent compounds are preferred.

Anionic detergents include both the soap and non-soap detergents. Examples of suitable soaps are the sodium, potassium, ammonium and alkanolammonium salts of higher fatty acids ($C_{10}$–$C_{20}$). Particularly useful are the sodium and potassium salts of the mixtures of fatty acids derived from coconut oil and tallow. Examples of anionic non-soap detergents are alkyl glycerol ether sulfonates, alkyl sulfates, alkyl monoglyceride sulfates or sulfonates, alkyl polyethoxy ether sulfates, acyl sarcosinates, acyl esters of isethionates, acyl N-methyl taurides, alkyl benzene sulfonates, and alkyl phenol polyethoxy sulfonates. In these compounds the alkyl and acyl groups, respectively, contain 10 to 20 carbon atoms. They are used in the form of water-soluble salts; the sodium, potassium, ammonium and alkanolammonium salts, for example. Specific examples are sodium lauryl sulfate, potassium, N-methyl lauroyl tauride; and triethanolamine dodecyl benzene sulfonate.

Suitable examples of cationic detergents are dilauryldimethyl ammonium chloride, diisobutyl phenoxy ethoxy ethyl dimethylbenzyl ammonium chloride, cetyl trimethyl ammonium bromide, N-cetyl pyridinium bromide and benzethonium chloride, which are classed as quaternary ammonium salts.

Suitable examples of amphoteric detergents are alkyl beta-imino dipropionates, and alkyl beta-amino propionates, wherein the alkyl group contains 10 to 20 carbon atoms, and basic quaternary ammonium compounds derived from 2-alkyl-substituted imidazoline.

Shampoo formulations can, of course, contain any of the usual shampoo additives such as color, perfume, thickeners, solvents, opacifiers, suds builders, conditioning agents, preservatives, buffers, and anti-static agents.

Generally, the pre-mix base shampoo comprises the above ingredients as specified, perhaps in conjunction with typical cleansers and moisturizers, oils and conditioners, and perhaps some petroleum tars. Such base shampoo systems are available, and the base shampoo itself selected does not form a separate and distinct basis for patentability of this invention, although its use in the combination and sequences and packaging and kit and method of this invention are claimed collectively as part of the invention.

The base shampoo will typically comprise approximately 90% of the volume overall of the customized, tailored and medicated composition. As explained hereinafter, the base shampoo is placed in a container 20, preferably a cylindrical container, as illustrated in FIG. 1 and unlabeled. It is this base shampoo composition that is used to add the specific medications to customize the shampoo for a specific companion animal.

Generally, the process involves the following. In a typical real world situation, the veterinarian is confronted with a particular pet companion animal, with the pet owner complaining of certain skin and hair conditions that both the owner and the animal find problematic. The veterinarian diagnoses the companion animal's skin and hair condition to determine the cause of the complaints and the particular conditions in need of treatment. Some of the more common conditions confronted are: seborrhea, pyoderma, eczema, hyperkeratosis, ichtyosis, pemphigus, pruritus, scaliness and psoriasis. After diagnosing the cause of the complaints, the veterinarian is then in a position to prescribe a treating medication. Because these animals are very frequently shampooed by their owners, a most effective means of treatment is to add the medication to the shampoo in the form of a concentrate. Put another way, a particularized medicated concentrate composition designed to treat the disturbances previously diagnosed is added to the pre-mixed base shampoo system as described above.

In accordance with the present invention, six different medicated concentrates, which collectively have been designed for this system, treat most of the common occurring skin disturbances. Those six concentrates are sulfur concentrate, salicylic acid concentrate, benzoyl peroxide concentrate, chlorhexidine concentrate, ethyl lactate/lactic acid concentrate, and finally, Vit. E-$B_5$ olive oil cream emollient concentrate. Obviously, the precise concentrates for the medicament and the number of bottles of medicament can be varied considerably. For example, one may use Aloe Vera, tea tree oil, oat meal in colloidal suspension, and others. Also, other medical actives can be used such as soluble organic sulfur compounds, coal tar, selenium sulfide, zinc oxide, amino acids such as allantoin, cystin or cystein, or both oil and soluable vitamins or provitamins, for example, pantothenic acid salts, and other vitamins like vitamins A and C. Skin disturbances where treatment with compounds containing antimicrobials, antifungals or anti-insecticides are indicated. As can therefore be seen, the system is very flexible. These concentrates in their current formulation can be described as follows.

Sulfur medicinalis: Indicated in cases of dry scaling due to increased turnover of the epidermal cells and/or superficial pyoderma. It has antipruritic and antifungal effect. Sulfur is both keratolytic and keratoplastic, and mildly "follicular flushing". It has synergistic activity with salicylic acid, and combination will provide bacteriostatic effect as well. The activity is due to formation of $H_2S$ and pentathionic acid. The concentrate also contains benzyl alcohol which has a mild surface anaestetic effect.

Salicylic acid: Is keratoplastic and can be used in cases of pyoderma, allergy, dry heat, pemphigus foliaceous and ichtyosis. Applied in conjunction with sulfur, it has a general antiseborrheic effect. The keratolysis is due to lowering of pH of skin, which increases hydration of the keratin and swelling of the corneacytes.

Benzoyl peroxide: Predominantly used for cases of greasy seborrhea with secondary bacterial component or mycotic dermatosis. Specific areas of indication are primary keratinization disorders with seborrhea oleosa, demodicosis, pyoderma and dermatophytosis. Benzoyl peroxide has a follicular flushing action which enhances bacterial removal from hair follicles. It is very drying, and wash with benzoyl peroxide should always be followed by a treatment of 'Humenctant non oil' as rinse or spray. Notice: Shampoo with benzoyl peroxide may bleach fabrics so clients should be warned!

Ethyl lactate & Lactic acid: Ethyl lactate reacts similar as benzoyl peroxide, however, has less drying activity and therefore may be used in cases that easily desiccate and develop dry skin and pruritus with benzoyl peroxide. The ethyl lactate concentrate is specially indicated in cases where frequent wash is indicated or in cases with light pyodermas or irritated skin. Ethyl lactate is converted to ethyl alcohol and lactic acid when applied to the skin, and the alcohol is responsible for the antimicrobial activity. Both the lactic acid stemming from the ethyl lactate and extra added natural lactic acid in the concentrate reduce the drying effect of the wash.

Chlorhexidine gluconate: Is a well accepted broad spectrum antibacterial and antifungal agent. It is non-irritating, rarely sensitizing, not inactivated by organic matter and highly effective with the base shampoo. Despite the fact it is a phenol related biguanide, it is safe for cats. Chlorhexidine is an excellent antideodorant due to the broad spectrum antiseptic activity (except Pseudomonas spp.).

Vit. $E+B_5$ & Olive Oil cream emollient: This is an olive oil based emollient which softens the stratum corneum by filling in the spaces between dry flakes with oil droplets. It protects and soothes the skin as well. This concentrate is emulsified to improve distribution in the shampoo base and release the pro vitamin $B_5$. It also helps to hold the water in the stratum corneum and to prolong hydration. When used in combination with any of the other concentrates, this Vit. $E+B_5$ emollient will reduce the drying effect of the active agents in these concentrates. Used alone with the base shampoo, it produces a nice gloss after the coat dries. Vitamin E is an antioxidant to preserve the natural oils in the olive oil.

The amount of each of these concentrates is in accordance with the above-specified range, i.e. 0.1% by weight to 35% by weight, preferably 0.2% by weight to 15% by weight of the total shampoo (includes the base shampoo and added medicament). Each of the concentrates is placed into an individualized cylindrical container (see reference number 12 in FIG. 1) with a pump dispenser (reference number 50 in FIG. 1), designed to dispense sufficient amounts, such as three strokes of the pump dispenses approximately twelve milliliters (ml). As a result, the amount of the concentrate by weight in the base shampoo is within the above-described range, providing that instructions are followed to achieve addition of the amount provided in three strokes of the pump dispenser.

After diagnosing the companion animal's skin and hair condition and determining a treatment selecting from a combination of the six different concentrates, the veterinarian writes a prescription consistent with the instructions provided in the shampoo kit. For example, instructions will provide that the sulfur medicinal concentrate should be used if there is dry scaling, an increased turnover of the epidermal cells, and/or superficial pyoderma. The salicylic acid concentrate can be used in cases of pemphigus, the benzoyl peroxide should be used in cases of greasy seborrhea, the ethyl lactate and lactic acid in cases of light pyodermas and/or irritated skin, chlorhexidine if fungal activity is noted, and the cream emollient concentrate if dry skin is noted. Thus, by following the instruction sheet, the veterinarian can select from the six concentrates, provide the necessary three stroke (approximately 12 ml) addition to the base shampoo, and thus a shampoo product particularized to the medicinal needs of a specific companion pet is provided. The prescription label 18, as depicted in more detail in FIG. 6, can be added to the shampoo bottle 20 so that the veterinarian can know that this animal's prescription comprises base shampoo with concentrates in positions 1 and 4, for example, relative to the left end of holder 30. And so the prescription is applied to the shampoo bottle 20 as a label 18 and can be used for directing periodic refills.

Although the veterinarian can use all provided medicament concentrates, typically only one or two will be used with each prescription. This allows the veterinarian to take advantage of the synergistic effect of the concentrates when combined as, for example, to use an emollient to soften some of the harsher ones such as benzoyl peroxide, and more specifically treat the underlying skin disease.

As can be seen, the particularized shampoo is so differentiated that each veterinary clinic is able to offer a tailor-made shampoo which complements the prescribed medical treatment. Services are provided by the veterinarian specific for a particular animal and the particularized and tailored attention provides more effective treatment for the animal. It is also appreciated more by the client, thus generating even more goodwill for the veterinarian.

A typical wash procedure with the shampoo is as follows. Wet the pet's fur with lukewarm water. Place the shampoo in a line along the back and spread it down on both sides of the pet. With a suitable quantity of water, the shampoo is massaged to a soft foam. It is important that as much foam as possible—containing the active ingredients—is massaged onto the skin. Allow the shampoo to work for 4–5 minutes, i.e. the wash procedure should last 4–5 minutes. The pet can be washed a second time if necessary. One should avoid shampoo getting into the eyes and ears during wash. Should it happen, then rinse immediately with plenty of water.

The fur is rinsed thoroughly once or twice with plenty of water to remove all of the shampoo. A bottle cap full of 'Humectant non Oil' per 2–3 liters can be added to the last rinsing water. On short-coated pets it can be sprayed directly on the fur. Towel dry the pet. 'Humectant non Oil' adds moisture to the fur and skin, and at the same time the fur becomes lustrous; the fur is easier to comb, and it prevents 'flyaway'.

'Humectant non Oil' is especially recommended after washing with a strong and drying shampoo such as benzoyl peroxide. Under cool conditions the pet should not be exposed to drafts or cold until it is completely dry.

This system as above described can be effectively used with the kit and packaging combinations described particularly in FIGS. 1 through 27, as further described below.

C. Individual Components

Referring again to FIG. 1, it can be seen that in the preferred embodiment, individual components of the system have the following attributes.

Bottles 20 are generally elongated, cylindrical containers with removable cap 42 and main portion 44. Cap 42 can be threadably connected to main portion 44, or otherwise sealingly but removably connectable. In the preferred embodiment, bottle 20 is made of plastic. Other materials are possible.

The pre-mixed base shampoo that is placed in bottles 20 is as described previously. Other formulations are possible.

Concentrate dispensers 12 likewise comprise a removable cover 46 on a main portion 48. Main portion 48 is generally cylindrical and has an interior capacity to dispense multiple dosages of concentrate. In the preferred embodiment, storage capacity of dispensers 12 is significantly larger than that of bottles 20 so that the user would have a substantial supply or inventory for supplying concentrate for a substantial plurality of bottles 20. Each dispenser 12 can have a dispensing mechanism. As shown in FIG. 1, the dispensing mechanism for dispensers 12 is dispensing mechanism 50, which comprises a pump of conventional type having a stem extending into the interior of dispenser 12, the stem having an open lower end generally positioned near the bottom of dispenser 12. Pumping action of the exposed head of mechanism 50 results in the ejection of an amount of concentrate. As previously discussed, mechanism 50 is configured so that generally equal amounts of concentrate are ejected for each stroke of mechanism 50 to assist in accurate, measured dispension of concentrate. Again, dispensers 12 are preferably made of plastic because of cost, flexibility in design, and durability. Other materials are possible. Some portions of dispensing mechanism 50 may be made of other materials.

Display holder 30 is made of cardboard that is folded to create the rectangular in cross section shape shown in FIG. 1 with a hollow interior. Mating openings, so that dispensers 12 can be placed into holder 30, are made in the top surface of holder 30. Indicia 32 can be printed on labels that are then attached to holder 30. Otherwise, indicia can be preprinted or marked directly on holder 30. Indicia 34 on dispenser 12 is usually a label that is secured by adhesive to dispensers 12, such as is known in the art. Indicia 34 could also be directly marked onto dispensers 12. Other ways of indicating information regarding dispensers 12 or holder 30 and indicating the positions along holder 30 are possible.

Instruction sheets 14 and 16 can be paper with indicia printed thereon, and then lamination placed around that paper for durability and longevity of the instruction sheets. Sheets 14 and 16 can contain a variety of indicia, which will be discussed in more detail below. They can be separate items that can be picked up and reviewed by a user. Alternatively, information on instruction sheets 14 and 16 could be placed on the components, for example, bottle dispenser 22. Other options are possible.

Bottle labels 18 are conventional paper labels having a removable backing to reveal a self-adhesive that is compatible with bottles 20 so that labels 18 can be quickly and easily secured to bottles 20 in a durable and long lasting fashion. Labels 18 are made of a material that allows information to be written upon them and to allow ink or pencil to adhere and not streak or smudge.

Bottle dispenser 22 is made of cardboard that is folded to create the somewhat cubical shape shown in FIG. 1. Appropriate cutouts and removable portions are created to allow an opening for dispension of bottles 20 and a slot to create label holder 24. Other materials are possible, as well as other shapes and configurations for dispenser 22. Similarly, display holder 36 is made of cardboard folded to create the shape shown in FIG. 1. Container 38 can also be of plastic or other materials according to choice.

Figure 2:
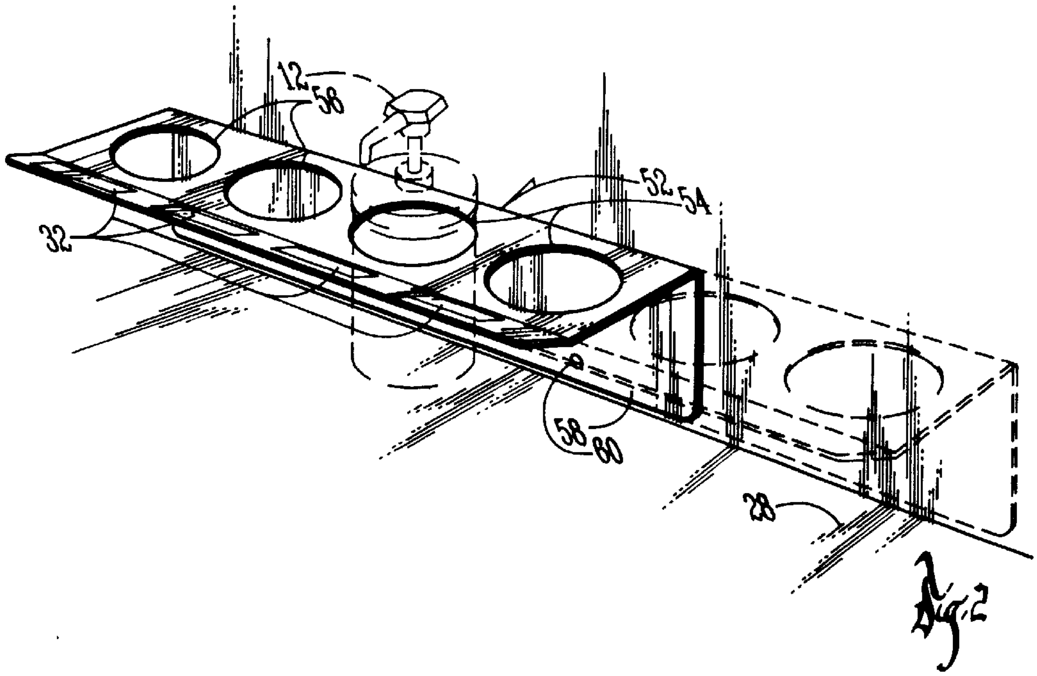
FIG. 2 is a perspective view of an optional holding and display bracket that can be used with certain of the components of FIG. 1.

FIG. 2 illustrates an alternative display holder 52 that could be used instead of holder 30 of FIG. 1. Holder 52 can be made of metal such as stainless steel, and have a horizontal surface 54 with openings 56 to receive dispensers 12 as shown. Indicia 32 could again be used to indicate the relative position of each hole 56 to essentially provide a code for which dispenser 12 is in which location. The portion 58 of L-shaped holder 52 includes several apertures 60 (only one shown in FIG. 2) to cooperate with fasteners such as screws or bolts to be used to attach holder 52 to a wall or some other supporting structure. Holder 52 allows the plurality of dispensers 12 to be placed on a wall or an elevated position from support surface 28 to either provide additional room on support surface 28, or for ease of dispension of the concentrates. Holder 52 can be made to hold as many containers 12 as needed (see dashed lines).

Figure 3:
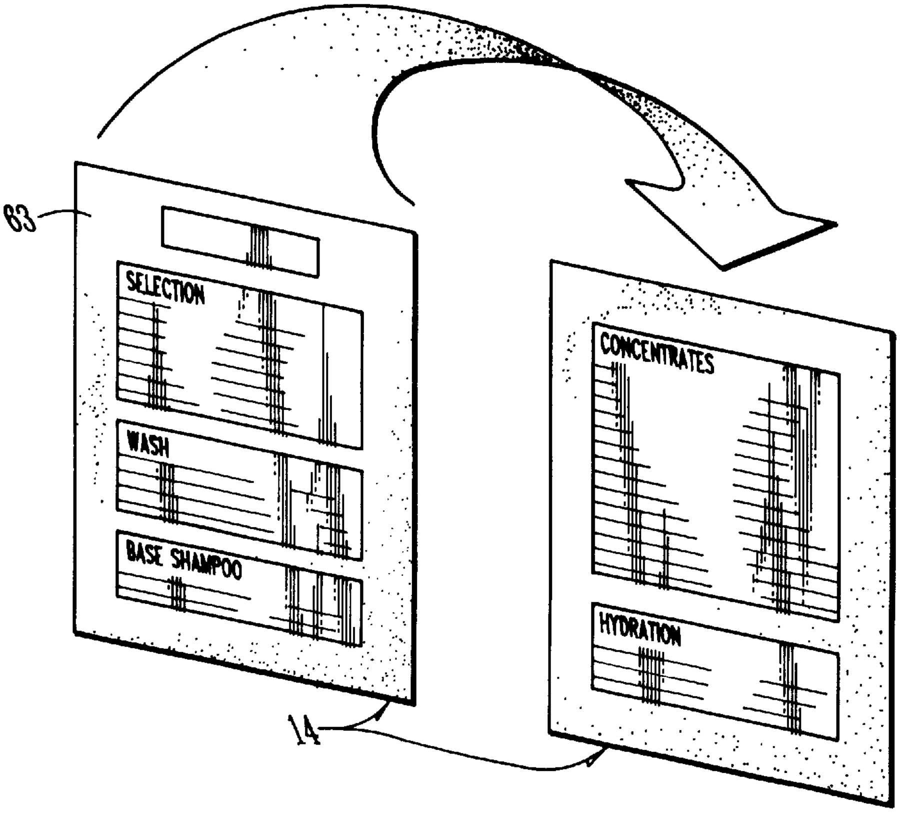
FIGS. 3 and 4 are perspective views of printed matter that can be used with the invention.
Figure 4:
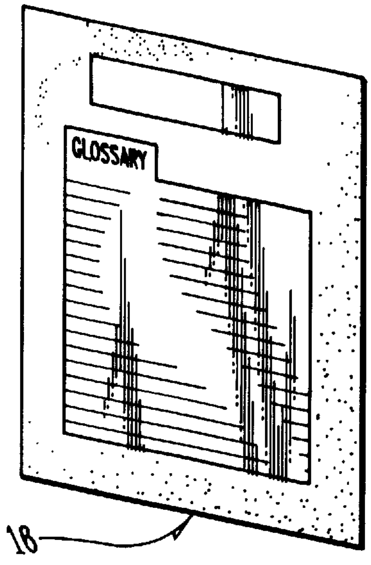

FIGS. 3 and 4 illustrate instruction sheets 14 and 16 respectively. In FIG. 3, instruction sheet 14 (preferably laminated in clear plastic) has a front 63 and a back 65. As indicated in FIG. 3, various information can be located on surfaces 63 and 65. For example, information regarding how to select which medicated concentrate for which type of dermatological condition can be set forth. Information can also be provided giving guidance as to selecting which concentrates or collection of concentrates. Information related to the content and use of the base shampoo can also be included. The function of information sheet 14 is to provide instructions and guidance to assist the user of the system, such as the veterinarian. The veterinarian or other user exercises his or her knowledge and discretion with respect to diagnosis of the dermatological condition. Instruction sheet 14 provides specific instructions with respect to which pre-mixed, medicated concentrate to utilize, and dose amount.

FIG. 4 shows instruction sheet 16 which here consists of a glossary of terms that occur in instruction sheet 14. The interaction between sheets 14 and 16 allows further assistance to the user of the system to select medication and the dose as well. Sheet 16 can be used in one hand, whereas sheet 14 can be positioned to be used simultaneously.

D. Kit

Referring back to FIG. 1, the system of the present invention includes a set of concentrates in separate concentrate dispensers 12, each clearly labeled with indicia 34 and placed in a holder 30 or 52 in a position correlated to indicia 32. Each dispenser 12 includes dispenser mechanism 50 which produces a predetermined dose of concentrate for each operation of mechanism 50.

The types of concentrates utilized are set forth previously. Others are possible. Holders 30 and 52 can accommodate the desired number of concentrate selections which will then be all together and immediately available for use. The quantity of pre-mixed medicated concentrate in each dispenser 12 is intentionally selected to allow for a substantial number of dosages to be dispensed over time. In other words, once a set of concentrates is obtained, many different prescription shampoos 10 can be created and vended to customers before the concentrates must be replaced. In the preferred embodiment, the volume of concentrate contained by dispensers 12 is approximately 450–500 ml. This of course can vary.

Instruction sheets 14 and 16 can be placed at or near the other components of the kit. Preferably, they can be picked up and reviewed, but alternatively, they could be posted in a permanent or semi-permanent position.

Bottle dispenser 22 with labels 18 and a plurality of bottles 20 are placed near concentrate dispensers 12 in a fashion that allows easy access to successive bottles 20. Likewise, if desired, humectant in containers 38 can be placed in display holder 36 near the other components of the system. As shown in FIG. 1, therefore, the kit of components allows for a user, such as a veterinarian, to have guidance regarding dermatological problems, what to prescribe to try to solve the dermatological problems, assistance in understanding terms of art related to the dermatological problems, information regarding the pre-mixed base shampoo in bottles 20, and then instructions as to what concentrate and dosage of concentrate should be utilized with the predetermined quantity of base shampoo for the particular diagnosed dermatological problem.

E. Collective Operation

Figure 5:
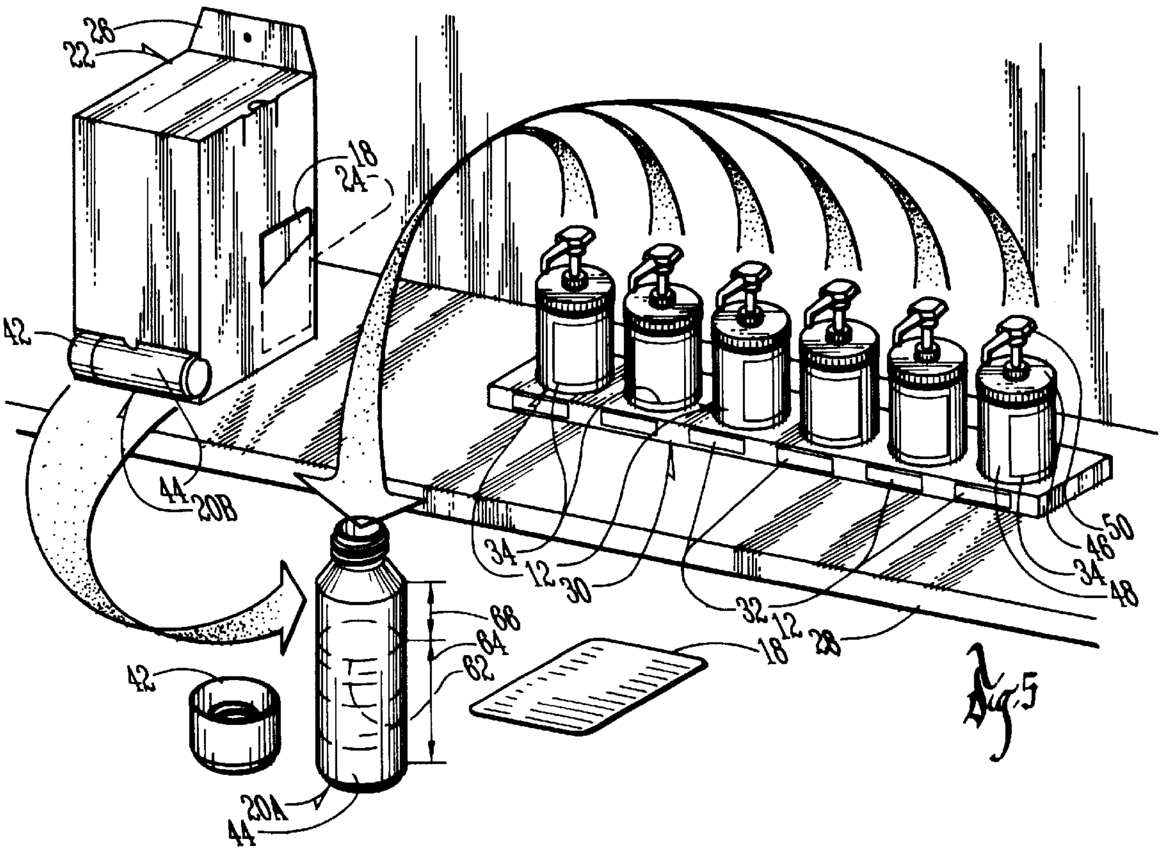
FIG. 5 is a diagrammatic view illustrating use of the components of FIG. 1.

By referring to FIG. 5, it can be seen that once user determines the dermatological problem, a bottle 20 (see reference numeral 20A) is pulled from bottle dispenser 22, and cover 42 is removed. As shown in FIG. 5, pre-mixed base shampoo 62 has already been placed in bottle 20. Note particularly, by referring to reference numerals 64 and 66, that base shampoo 62 occupies only a portion of the interior volume defined by bottle main portion 44 (see reference numeral 64). A predetermined volume (see reference numeral 66) is intentionally left unoccupied. The bottle main portion 44 should have a sufficient volume such that even after adding medicament, excess unfilled volume remains so that the bottle can be vigorously shaken to mix its contents.

As will be discussed later, a succeeding bottle 20B automatically moves into the position shown in bottle dispenser 22 in FIG. 5 ready for the next prescription.

By utilizing instruction sheets 14 and 16 (not shown in FIG. 5), a particular quantity of concentrate from one or more pre-mixed medicated concentrate dispensers 12 is indicated. Bottle 20A is then moved into place under dispenser mechanism 50 of the instructed concentrate dispenser 12, and the instructed amount of such concentrate is ejected from concentrate dispenser(s) 12 into the unoccupied volume of bottle 20A. The user removes a label 18 from label holder 24 and writes on label 18 the code indicating the position of concentrate dispenser 12 in holder 30 (by using indicia 32 on holder 30). In this manner the user does not have to describe the specifics of the concentrate, but rather can use an indicator such as "1", "2", . . . "6". The "1" means the concentrate in the left-most position in holder 30, "2" means the concentrate to the immediate right of "1", and so on. This makes it much quicker to record which concentrate (s) were dispensed into bottle 20A, but also does not allow others to know the specific contents of bottle 20A without knowing the correlation to the location of the particular concentrates in the particular holder 30. This requires the pet owner to return to the same veterinarian. Thus, other veterinarians cannot replicate the mixture of concentrate and base shampoo by simply looking at the label.

Figure 6:
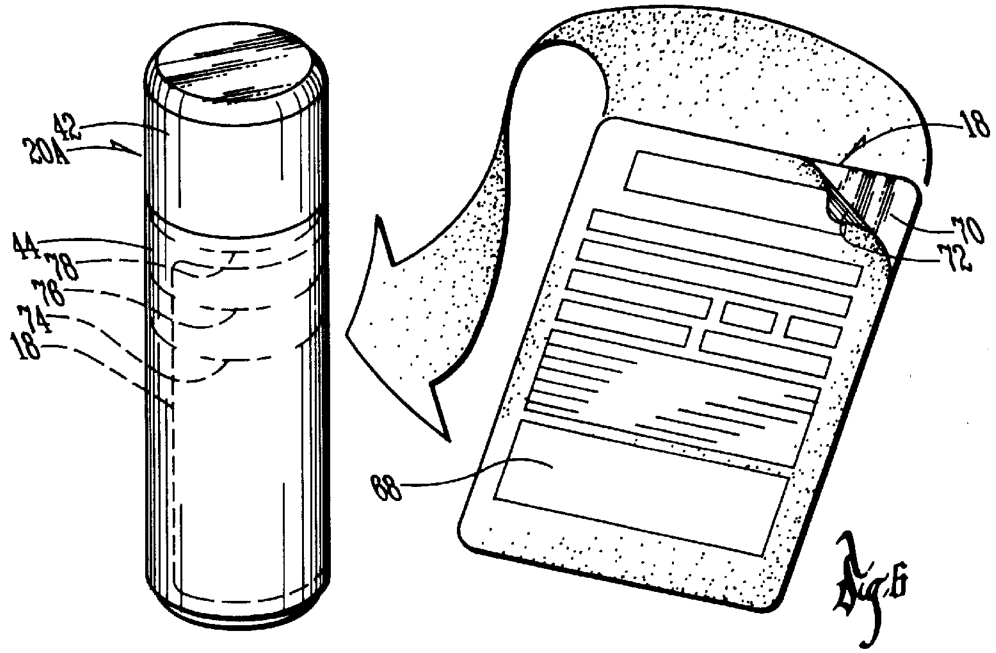
FIG. 6 is a diagrammatic view of a label used with a container from FIG. 1.

By referring to FIG. 6, label 18 can be preprinted to present a number of fields or blank spaces that can be filled in by the user. For example, the name of the customer, the name of the companion pet, date, dermatological condition, code(s) of the concentrate(s), and other information can be placed by writing onto the label. As previously described, label surface 68 allows handwriting to be placed in a permanent fashion into the appropriate fields. Label 18 then be separated from backing 70, and self-adhesive 72 on the back of surface 68 allows label 18 to then be moved over and adhered to bottle 20A. Dashed line 74 indicates the original level in bottle 20A of base shampoo 62. In this example, dashed line 76 indicates that a dose of a first concentrate has been added to the base shampoo and occupies an additional volume in bottle 20A. Dashed line 78 indicates a second concentrate has been added to further fill up bottle 20A. As earlier mentioned, it is preferred that additional unoccupied space still remains in bottle 20A so that once lid 42 is reattached, bottle 20A can be shaken and the extra room inside enhances mixing of the concentrates and the base shampoo.

F. Manufacturing and Packaging

The system according to the invention is manufactured and to an extent pre-packaged, to further the objectives of ease and efficiency in creating the final product 10 that is provided to the customer. The pre-mixed base shampoo is filled up to a predetermined volume in each bottle 20 prior to packaging. In the preferred embodiment, bottles 20 have an interior volume of approximately 150 ml. The amount of base shampoo pre-packaged into bottle 20 is approximately 120 ml. The ingredients of the base shampoo and its volume have been predesigned to cooperate effectively with the predetermined dosages (here 12 ml each) of the concentrate from any of the concentrates in concentrate dispensers 12.

Caps 42 of bottles 20 are placed onto each bottle 20 in a secure manner to prevent leakage during shipment. Then bottle dispenser 22 is filled up with the number of bottles 20 pre-filled with the measured quantity of base shampoo. Generally, dispenser 22 will only be sold completely filled with bottles 20 so that there is no room for bottles 20 to move around during shipment.

Figure 7:
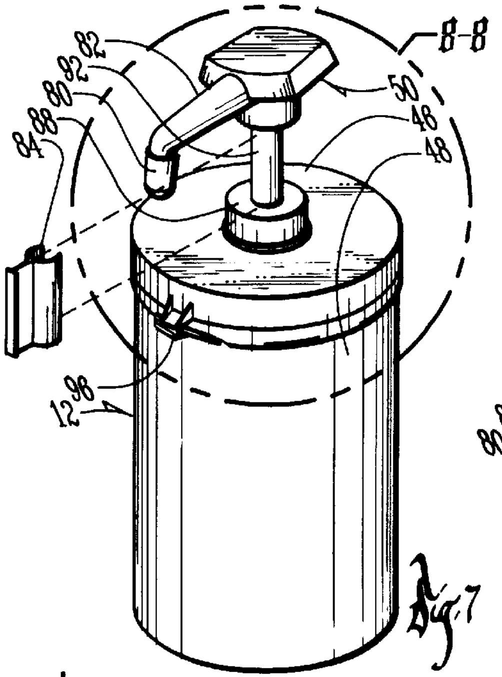
FIG. 7 is a perspective view of a container of the type used for some of the containers of the system of FIG. 1, showing in more detail certain structural aspects of that type of container.

Each concentrate dispenser 12 is generally completely filled with a concentrate. Referring to FIG. 7, in the preferred embodiment covers 46, including dispensing mechanisms 50, are placed onto the main portions 48 of dispensers 12. It is most times desirable to secure the dispensing mechanism 50 so that there will be no inadvertent ejection of concentrate during shipment. One option is to place a removable block in the form of a cap 80 (see FIG. 8) over the dispensing end 82 of mechanism 50. Additionally, a pump jamb 84 (FIG. 8) can be removably placed between pump head 86 and pump connection 88 to prevent mechanism 50 from operating. Pump jamb 84 includes a tubular portion 90 which surrounds pump stem 92 of mechanism 50 and holds pump head 86 in an extended position, not permitting head 86 to travel downward and create any pumping action. Channel 93, along the longitudinal axis of tube portion 90, allows jamb 84 to be snapped around stem 92 (see also FIG. 7). Jamb 84 is made of a plastic material that has enough resiliency and flexibility to allow that snapping action. Grip 94 extends from tubular portion 90 to allow the user to firmly grip and control either removal of jamb 84 or insertion of jamb 84 around stem 92. Generally, jamb 84 will be inserted after dispenser 12 has been filled and is ready for shipment, and will remain in position until unpacked by the end user. Jamb 84 could be selectively removed and replaced to prevent undesired dispension of concentrate even after placed in display holder 30 or 52, if desired.

FIGS. 7–10 depict another shipment and security option for dispensers 12. A removable seal (designated generally at reference numeral 96) can be incorporated into dispenser 12. Cover 46 (mateably threaded onto main portion 48 of dispenser 12) includes a removable lower portion 98 that is integral with cover 46. By referring to FIG. 10, it can be seen that the main portion of dispenser 12 has an outer extending lip or ridge 100 encircling main portion 48 of dispenser 12. Lower portion 98 interfaces with lid or cover 46 at a constricted portion 102 that also extends all the way around cover 44. Lip 100 mates into a recess defined by constricted portion 102. Shoulder 106 of portion 98 is just below constricted portion 102 and prevents cap 46 from being removed from main portion 48 of dispenser 12 as long as removable lower portion 98 is in place.

Figure 10:
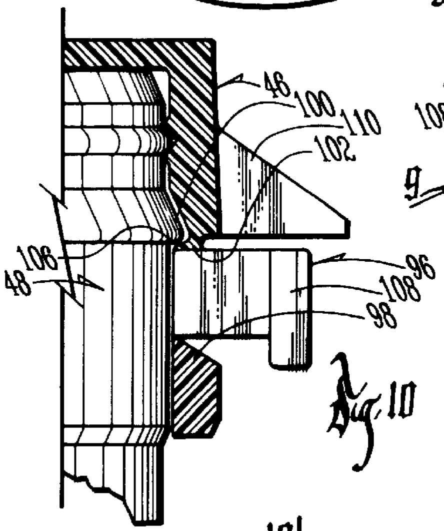
FIG. 10 is a sectional view taken along line 10—10 of FIG. 9.
Figure 9:
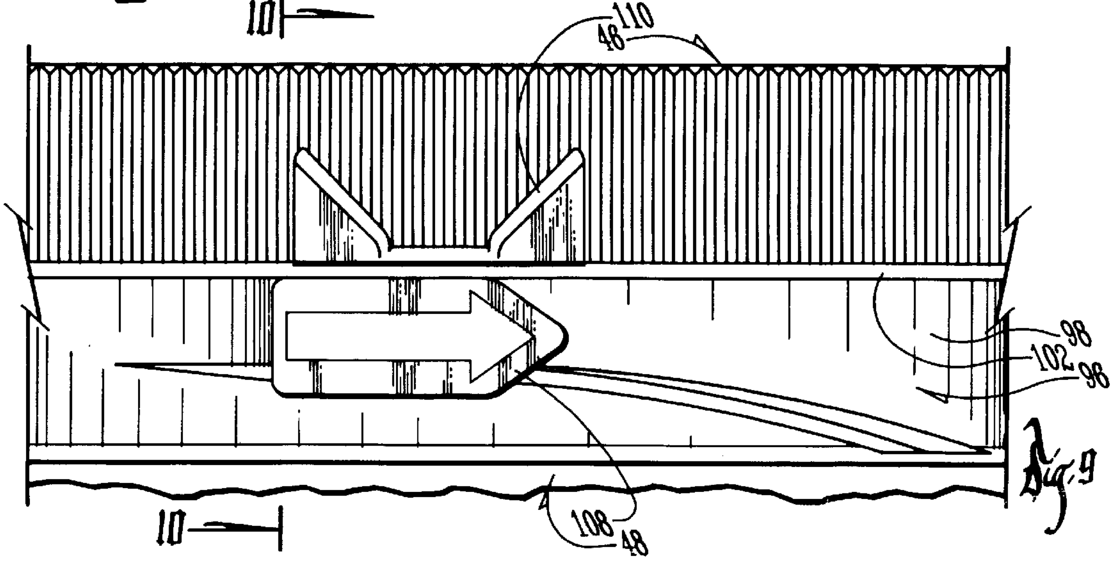
FIG. 9 is an enlarged fragmented view of a portion of FIG. 8 indicated at line 9—9 of FIG. 8.

As shown in FIGS. 7 and 10, portion 98 essentially forms a band around dispenser 12. Its shoulder 106 is held in place under lip 100 of dispenser 12 because portion 98 is integral with cover 46 all around dispenser 12 (at constricted portion 102).

Figure 8:
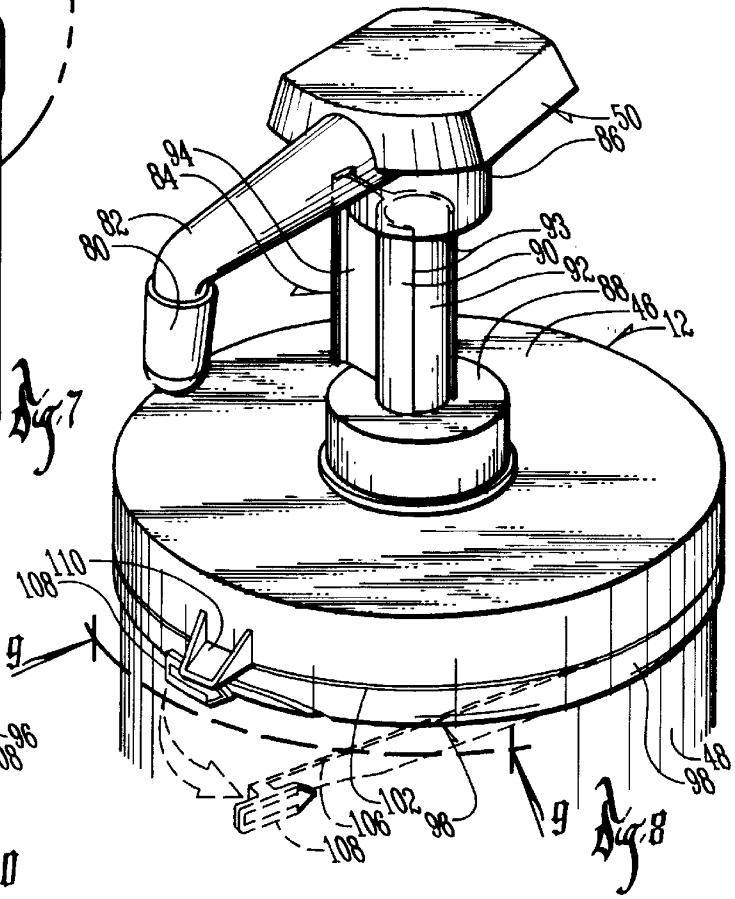
FIG. 8 is an enlarged view of the portion of the container of FIG. 7 indicated by line 8—8 of FIG. 7.

As can be seen, however, at FIG. 8, by gripping member 108 and pulling in the direction of the arrow, with sufficient force, lower portion 98 to be separated from lid 46. Essentially, by continuing removal of removable lower portion 98 from around the circumference of dispenser 12, the entire removable lower portion 98 can be taken away, freeing lid 46 to be removed.

A ledge 110, extending outwardly and over member 108 from lid 46 is put in place to deter or prevent easy grabbing of member 108, or inadvertent forces starting the removal of lower portion 98.

Generally, this security device deters any unwanted removal of cover 48 and access to or spillage of the concentrate that has been pre-packaged into dispenser 12. Seals 96 can be left in place forever, or can be broken if dispenser 12 is to be refilled. Generally, however, a new container of concentrate would be ordered, and lid 46 with dispension mechanism 50 would be removed from the old main portion 48 of a dispenser 12 that has been exhausted, and for economy purposes, dispenser mechanism 50 and lid 46 can then be placed on the new full container of new concentrate, and whatever lid or cover that might exist with the new container can be discarded.

The arrangement of seal 96 described above for cover 46 uses plastic materials. Other sealing or tamper-proof mechanisms could be utilized.

FIGS. 11–27 depict in detail preferred embodiments of packaging for various components of the system. It is to be understood that there are a variety of ways to create such packaging. However, as set forth below, these embodiments allow not only packaging of components for shipment, but in most instances, allow conversion of the packing container into a display or holding device for the end user (e.g. veterinarian). Furthermore, as will be seen, packaging is preferably made of cardboard which is initially a flat, unitary piece, which is then shaped and folded into the final container. Thus, inventory of such packaging can easily be maintained in space-conserving stacks of the cardboard flats.

Figure 11:
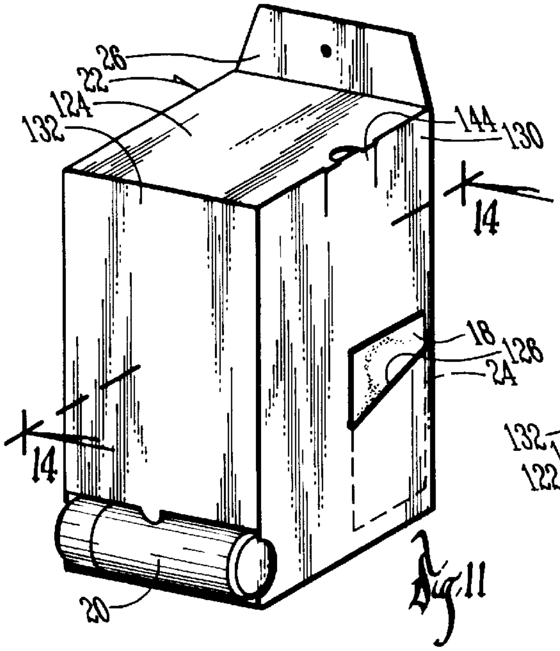
FIG. 11 is a perspective view of an example of a shipping and display container from FIG. 1 configured in its assembled display mode.
Figure 12:
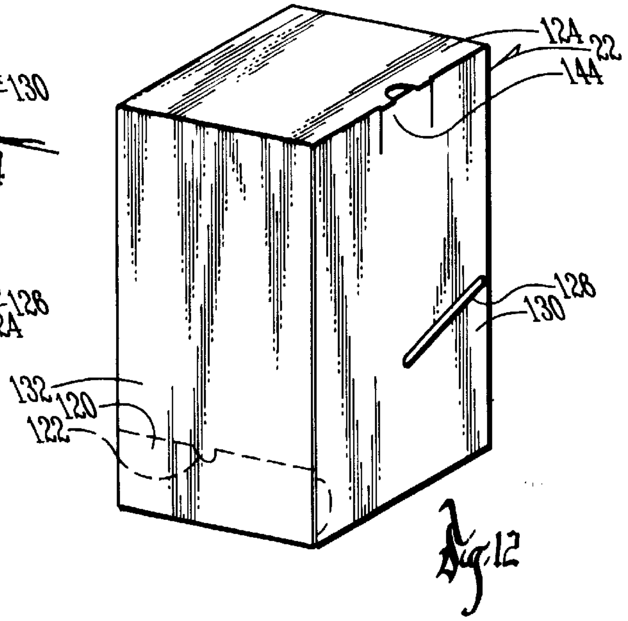
FIG. 12 is the container of FIG. 11 in its assembled shipping mode.

FIGS. 11–15 illustrate the bottle dispenser 22. FIG. 11 shows it in the display mode after it has been received by the end user and configured for use in dispensing the prescription shampoo. FIG. 12, by comparison, illustrates the container 22 in shipment mode.

The differences between container 22 in FIGS. 11 and 12 are as follows. Portion 120 (as shown in FIG. 12 by dashed line 122) has been punched out, revealing a bottom-most container 20 ready for dispension (see FIG. 11). Top 124 has been opened, and wall attachment 26 has been folded up and outward. Also labels 18 have been placed in slot 126 of holder 24.

Figure 16:
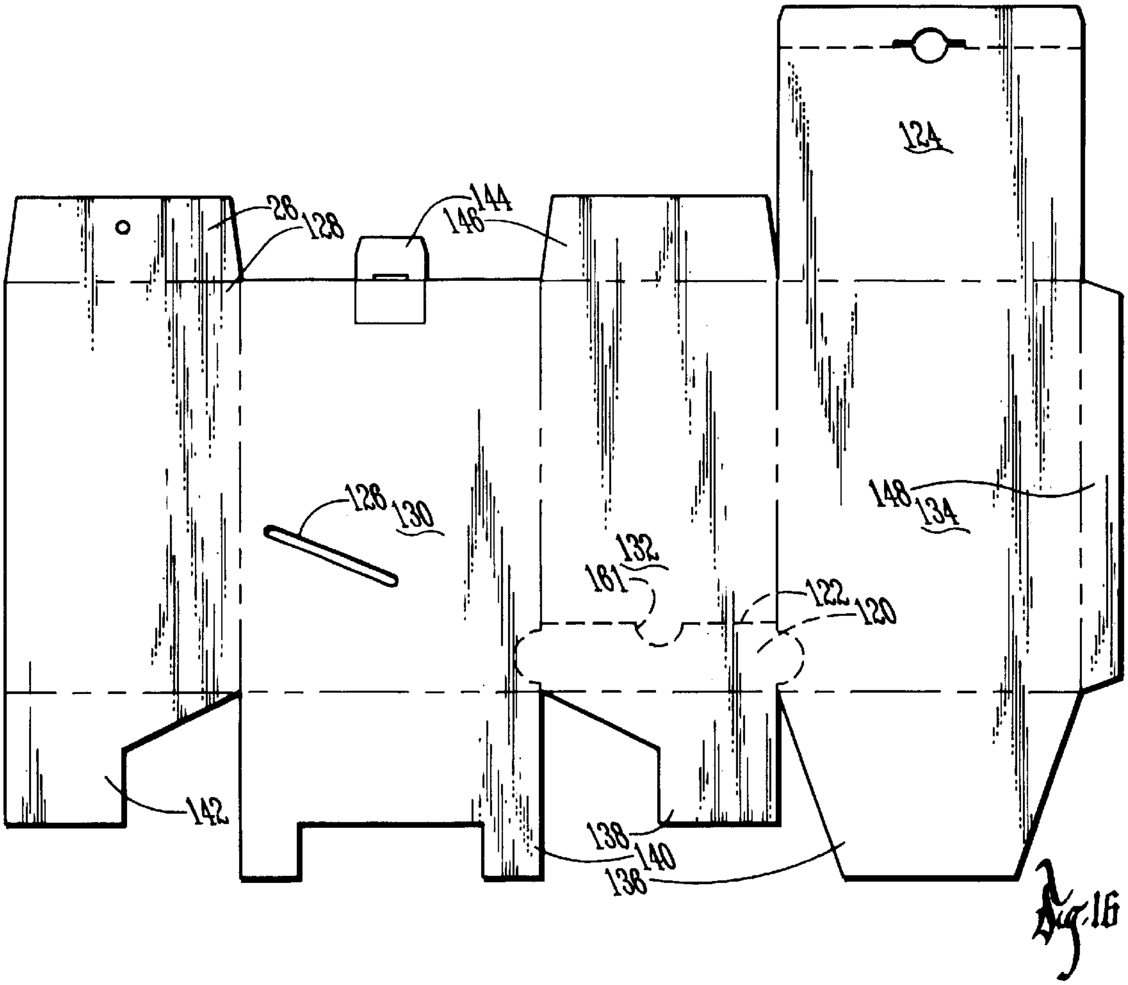
FIG. 16 is a plan view of the container of FIG. 13 in its unassembled, unfolded state.
Figure 17:
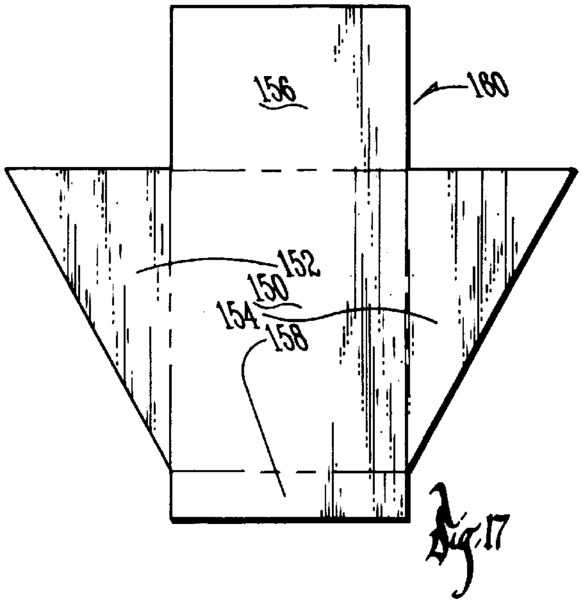
FIG. 17 is a plan view of an interior inserted portion of the container of FIG. 11 in its unassembled, unfolded state.

By referring further to FIGS. 16 and 17, it can be seen that the structure of dispenser 22 is formed from a pre-cut flat of cardboard consisting of the following sections: top 124, back 128, right side 130, front 132, left side 134, bottom forming flaps 136, 138, 140, and 142, wall attachment 26, top latch 144, top flap 146, and side connection 148.

Figure 13:
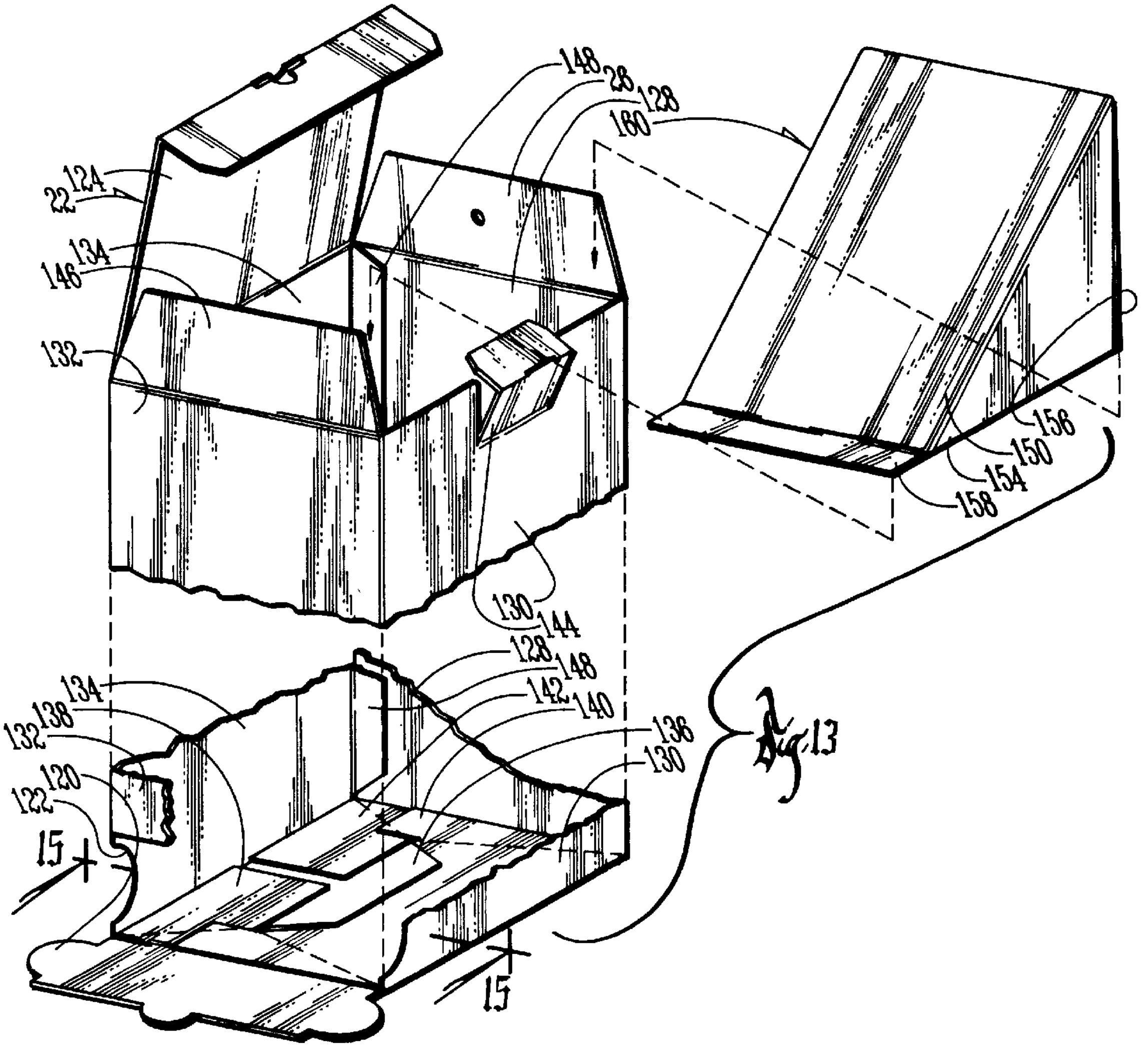
FIG. 13 is a perspective exploded view of the container of FIG. 11.
Figure 14:
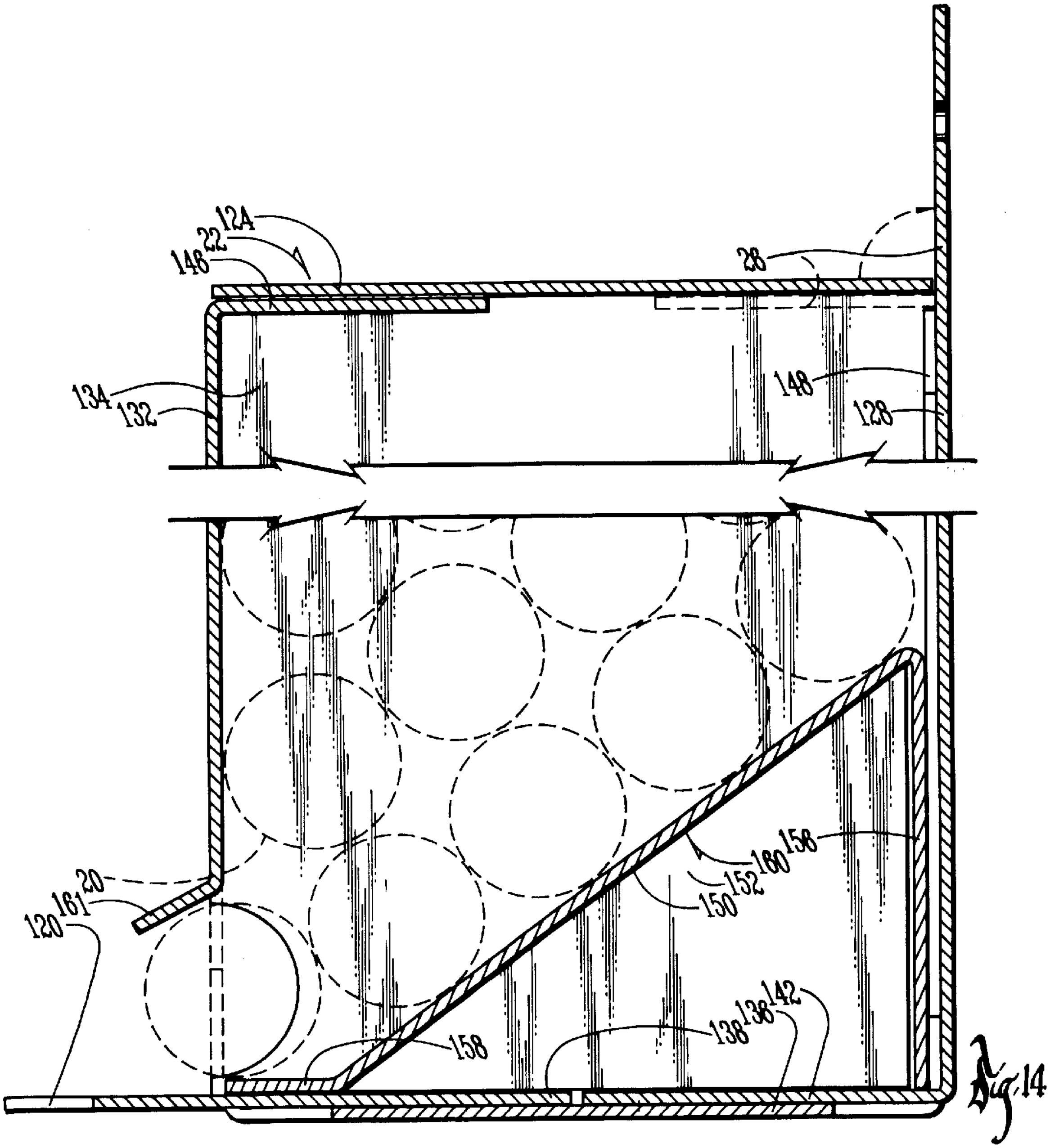
FIG. 14 is an enlarged sectional view taken along line 14—14 of FIG. 11.
Figure 15:
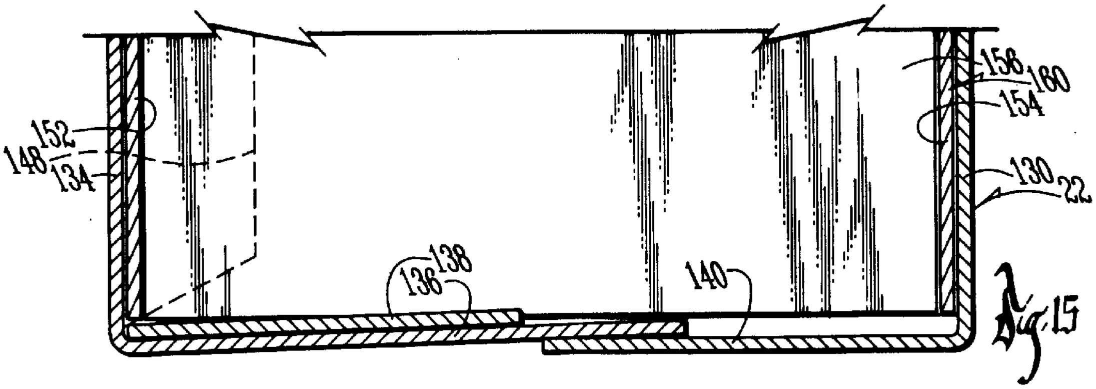
FIG. 15 is an enlarged sectional view taken along line 15—15 of FIG. 13.

Additionally, referring to FIGS. 13, 14 and 17, a ramp 160, formed of one piece of cut out flat cardboard, consists of ramp surface 150, left and right side walls 152 and 154, back wall 156, and front lip 158.

By referring to FIGS. 11–17, and reference numerals indicated thereon, it can be seen how the flats of FIGS. 16 and 17 are folded into the shapes that create the ultimate dispenser 22. Referring to FIG. 14, it can be seen that once portion 120 is removed, a flap 161 remains to deter a bottom-most bottle 20 from rolling out of the opening left by the removal of portion 120 from dispenser 22. The remaining bottles 20 sit on ramp surface 150 or on top of one another, and by gravity are biased to move towards the opening defined by line 122 in FIG. 12. Thus, multiple bottles 20 can be packed into dispenser 22 at the factory, and with simply the removal of piece 120 can begin to be dispensed and can automatically by gravity have successive bottles 20 move into position to be easily dispensed. The construction of dispenser 22 is such that it can withstand shipment and has no outwardly extending features that would catch on other containers during shipment. With only a few modifications by the end user, it can be converted into not only a holder of bottles 20 waiting to be configured into a prescribed shampoo given to a customer, but also used as a display and functional component of the system for preparing that final product for the customer. Dispenser 22 has sufficient structural strength and integrity for durability purposes, and yet is economical.

In the figures illustrating the plan view of flats that are assembled to become shipping and/or display containers, fold lines are indicated as well as break-away portions. Final assembly relies on the interaction of the various portions, including flaps, such as is within the skill of those skilled in the art. Adhesives may be used selectively, but are not necessarily needed.

Figure 18:
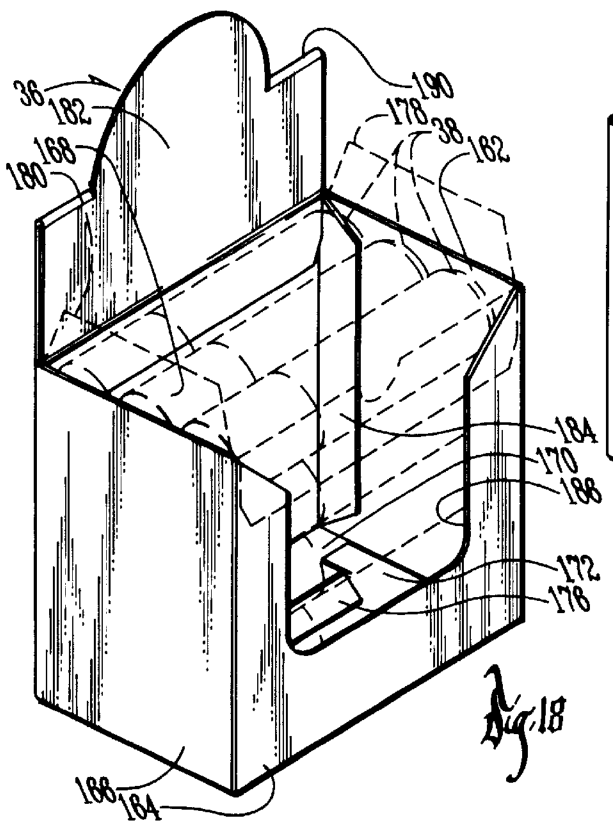
FIG. 18 is a perspective view of another storage and display component from FIG. 1 in its assembled display mode.
Figure 19:
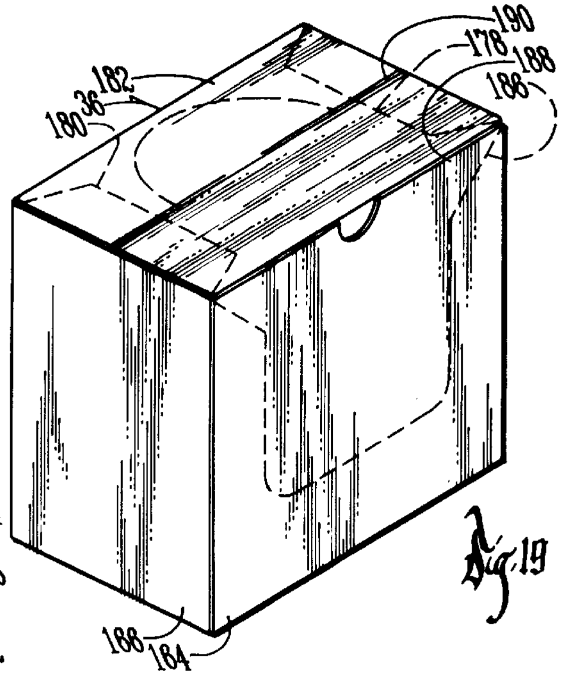
FIG. 19 is a perspective view of the component of FIG. 18 in its assembled shipping mode.
Figure 20:
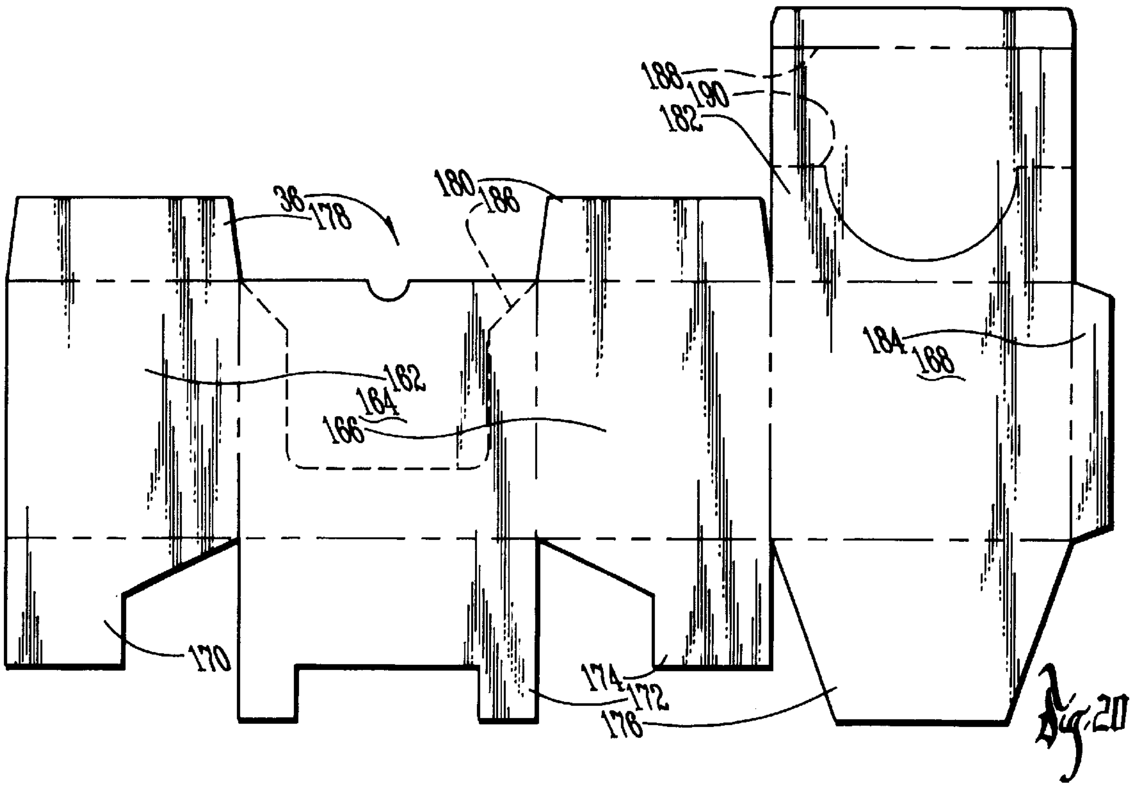
FIG. 20 is a plan view of the component of FIG. 18 in an unassembled, unfolded state.

FIGS. 18–20 depict a shipping and display container 36 for optional products with the system of FIG. 1 such as humectant. FIG. 18 shows container 36 in a display mode; FIG. 19 shows it in a shipping mode.

FIG. 20 shows that container 36 can be constructed out of a single flat piece of cardboard cut out into the shape shown, which consists of left side 162, front 164, right side 166, back 168, bottom forming flaps 170, 172, 174, and 176, top support flaps 178 and 180, top 182, and side flap 184.

FIG. 18 shows that to transform container 36 from shipping mode (FIG. 19) to display mode (FIG. 18) involves removing the portion of front wall 164 shown by dashed lines 186 and removing pieces 178 and 180. Top wall 182 is folded along fold lines 188 and 190 into the form shown in FIG. 18 to essentially allow access from the front and top to the interior of container 36 which would be filled with bottles or containers 38.

Again, from one sheet of cardboard, is a rigid and durable shipping container with no portions extending outside its general perimeter surfaces, and yet can be quickly and easily made into a holder and display by the end user.

Figure 21:
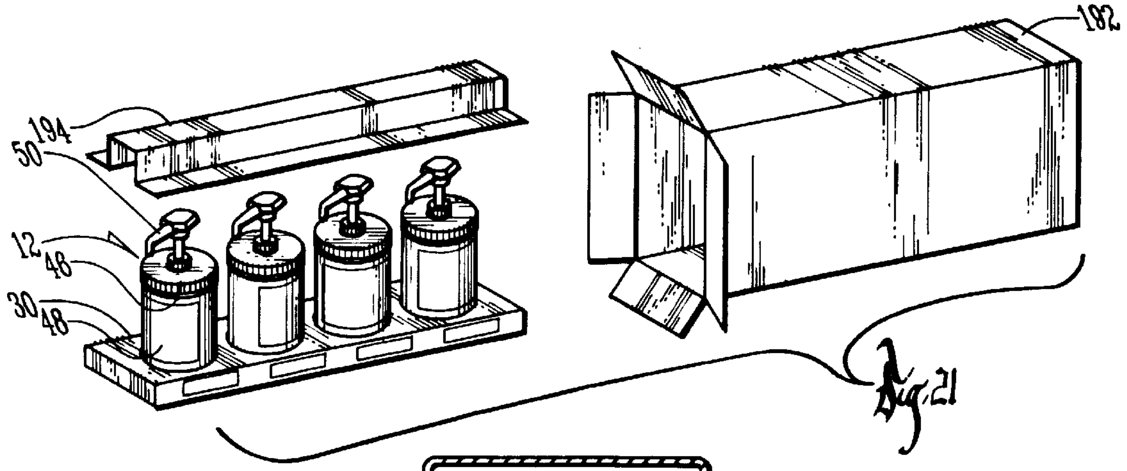
FIG. 21 is a perspective view of multiple containers and a display holder for those containers as shown in FIG. 1, a shipping box, and an internal spacer device, all in an exploded form.
Figure 22:
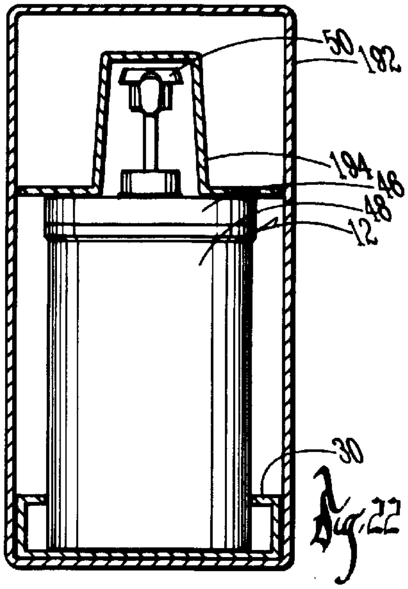
FIG. 22 is a slightly enlarged end elevational view of the items of FIG. 21 in unexploded form packed for shipment.
Figure 23:
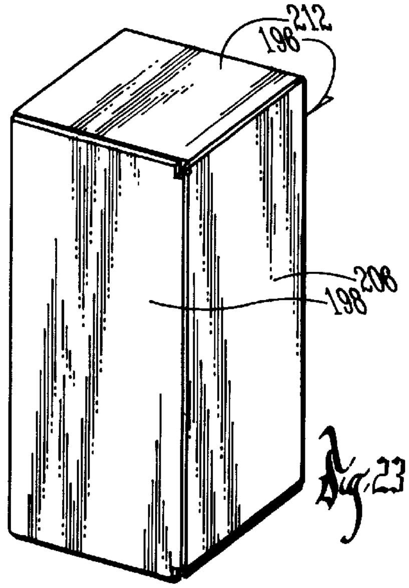
FIG. 23 is a perspective view of a shipping box for an individual container of the type shown in FIG. 21.

FIGS. 21 and 22 illustrate a shipping system for concentrate dispensers 12 already positioned in display holder 30. A cardboard box 192, preferably made from one sheet of cardboard and folded into that shape, is sized to receive display holder 30 and dispensers 12 positioned in holder 30. To buffer dispensing mechanisms 50 during shipment from forces that would try to displace of damage dispenser 12, a cardboard-formed piece 194 is placed over the dispensing heads of mechanisms 50 and rests upon the top of lids 46 (see FIG. 22). Each of the dispensing heads and nozzles are aligned along the longitudinal axis of piece 194 prior to packaging, to keep them in a secure position during shipment. When received by the end user, the holder 30 containing dispensers 12 is simply removed, the box 192 and piece 194 discarded, nozzles of dispenser mechanisms 50 turned 90° to the position shown in FIG. 5, and it is ready for use.

FIGS. 23–27 show a shipping container 196 that can be used to ship single concentrate dispensers 12. By referring to FIG. 27, it can be seen that container 196 can be made out of a single sheet of cardboard that is cut as shown and includes: front door 198 (with flap 200), left side 202 (with flaps 202A and 202B), back 204, right side 206 (with flaps 206A and 206B), bottom sections 208 and 210, top section 212, connecting sections 214 and 216, intermediate holder 218, and end flap 220.

Figure 24:
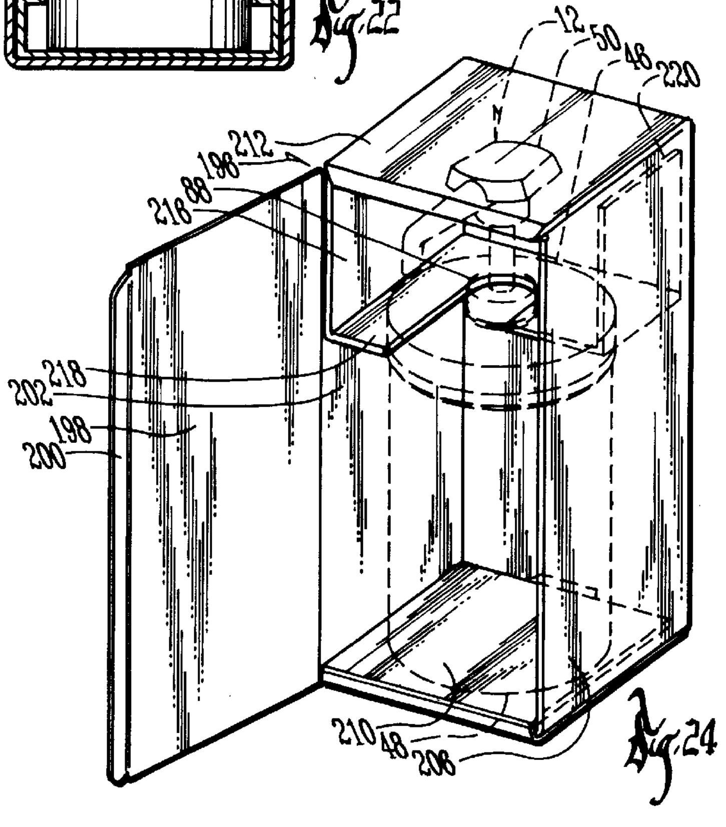
FIG. 24 is similar to FIG. 23, showing the interior of the component and in ghost lines a container in position for shipment.
Figure 25:
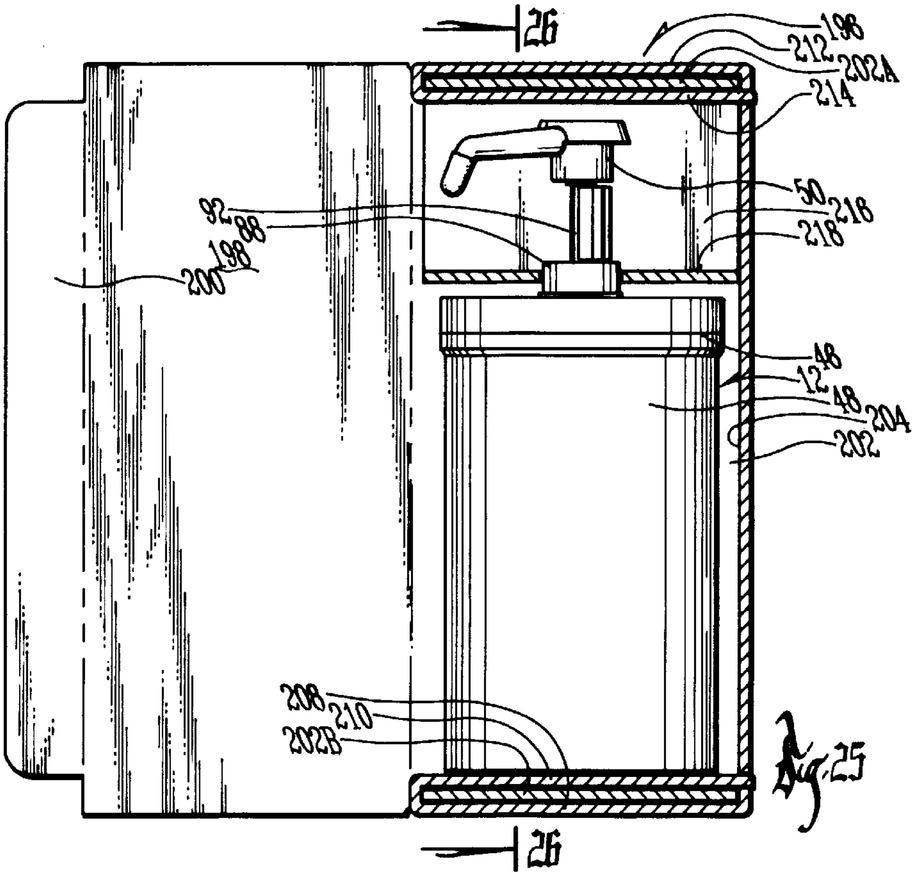
FIG. 25 is a front elevational view of FIG. 24 with the movable door in an open position and the container in shipping position.
Figure 26:
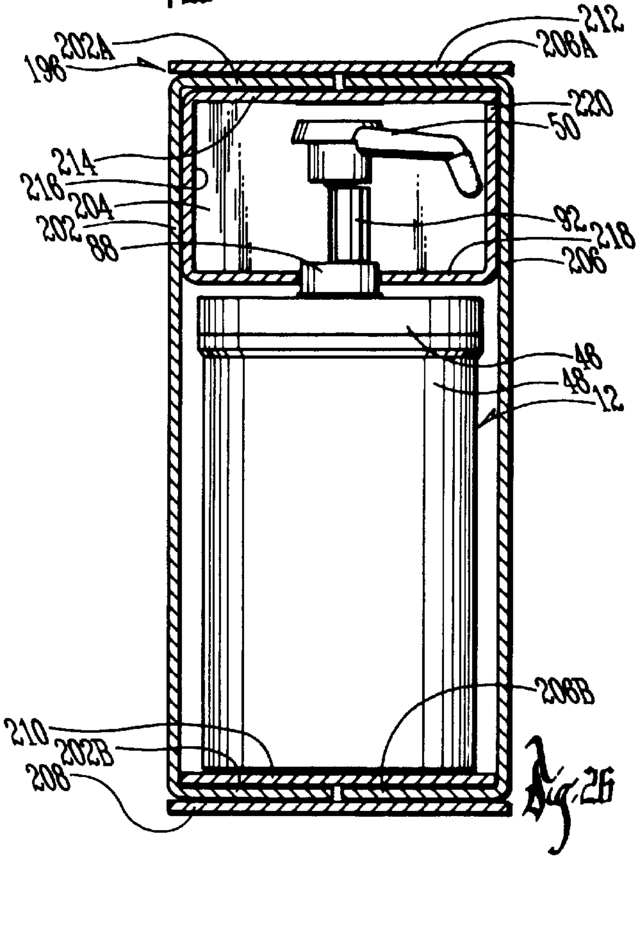
FIG. 26 is a sectional view taken along line 26—26 of FIG. 25.
Figure 27:
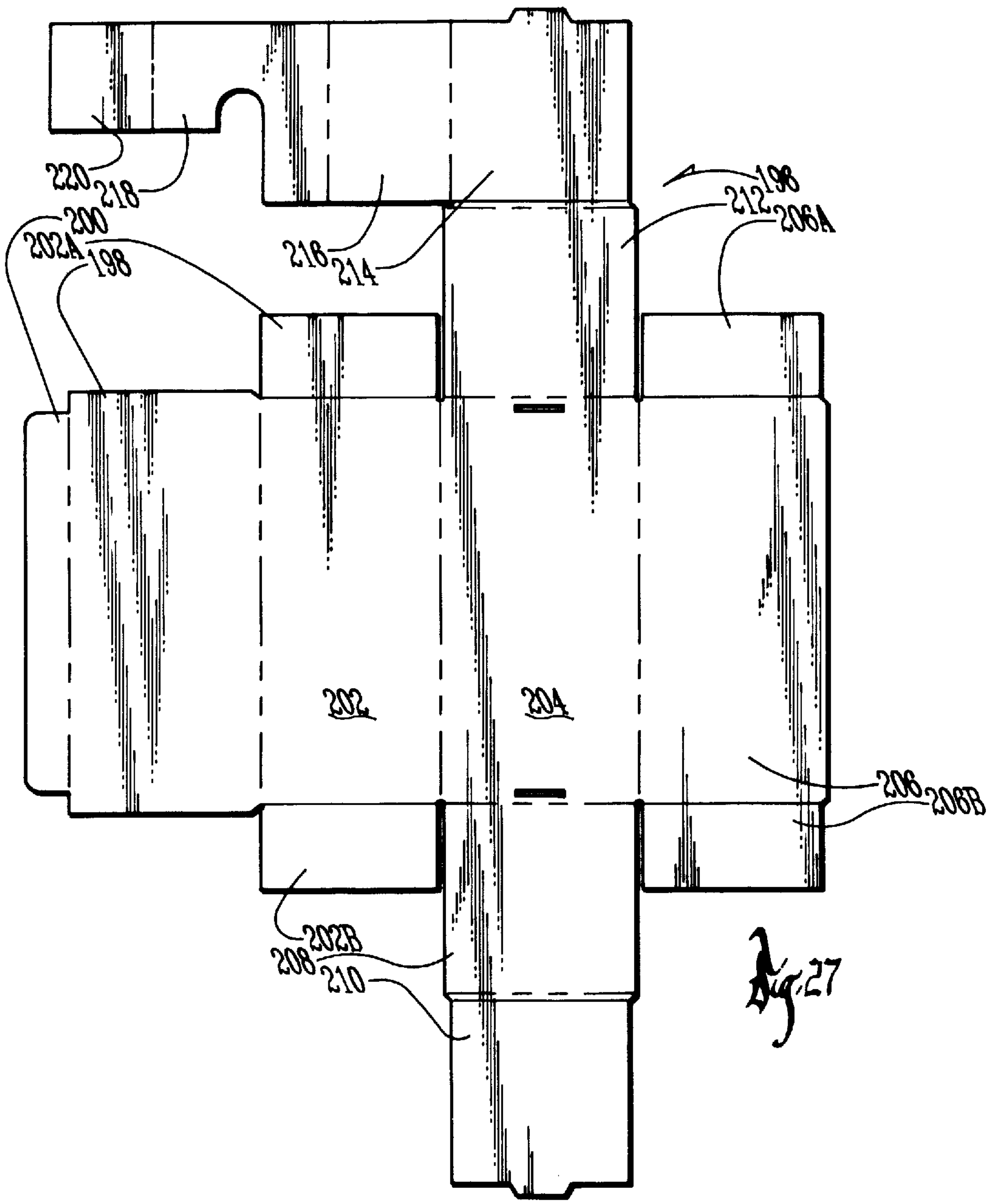
FIG. 27 is a plan view of the shipping container of FIGS. 23 and 24 in an unassembled, unfolded state.

As can be seen by then referring to FIGS. 24–26, the formation of the shipping container 196 can be accomplished to provide a structurally strong and durable container. Container 196 includes the intermediate holder 218 which is positioned to surround pump connection 88 and pump stem 92 in a substantial enough fashion to center and hold the entire container 12 in position during shipment. When received by the end user, front door 198 is simply opened, dispenser 12 removed, and container 196 can be discarded. It also could serve as an inventory storage device.

It is to be understood that container 196 could be used to ship dispensers 12 with a dispensing mechanism 50 or without.

It will be appreciated that the present invention can take many forms and embodiments. The true essence and spirit of this invention are defined in the appended claims, and it is not intended that the embodiments of the invention presented herein should limit the scope thereof.

What is claimed is:

1. A kit capable of being assembled and used by a user for creating a customized mixture of base shampoo and one or more concentrates, each concentrate selected to act upon a diagnosed dermatological skin or hair condition in a companion pet animal, the kit comprising the combination of:

a plurality of disposable first containers partially filled with a pre-selected fixed volume of multiple servings of a pre-mixed base shampoo for a companion pet animal and having a removable cap covering an access opening to allow access to the shampoo contained therein, each first container filled to a point that leaves enough room for several doses of pre-mixed medicated concentrate;

a plurality of disposable second containers each having an access opening and each holding a different pre-mixed medicated concentrate including a pre-selected amount of one or more active ingredients which acts upon a dermatological skin or hair condition of a companion pet animal;

a disposable dispensing mechanism mounted over the access opening of each second container, the dispensing mechanism comprising a manually operated pump which dispenses from a nozzle approximately the same volume of concentrate per pumping action of the pump to produce fixed doses of the concentrate of generally pre-known concentration and uniform size that can be added to a first container through an access opening;

a container holder including receivers for the second containers;

a set of instructions and information for use with said kit, said instructions and information being correlated with the parts in the kit, including the receivers of the container holder and/or the second containers, to prescribe certain dosages of one or more concentrates for each dermatological condition, the dosages related to the doses created by the dispensing mechanism to allow users of the kit to select the correct dosage of concentrate to act with the volume of the pre-mixed base shampoo; and a label having portions which can be written upon and which can be mounted upon a first container after said one or more concentrates have been added to the pre-mixed base shampoo, to identify the contents of the first container;

the concentration of each active ingredient of each concentrate being pre-correlated with the volume of shampoo in each first container, the relevant dermatological condition, and the fixed volume of the doses from the pump so that the user can inject fixed volume doses of one or more concentrates from the second containers into the fixed volume of shampoo in the first container and create a custom, medicated shampoo for a selected dermatological condition without having to measure a volume of concentrate or shampoo.

2. The kit of claim 1 further comprising a holder for said plurality of first containers, including an interior for holding and storing said first containers and a mechanism to automatically deliver successive first containers to a user access position.

3. The kit of claim 1 wherein the base shampoo occupies a substantial majority of the first container but sufficient space exists for several doses of concentrate to allow for the user to add several doses of concentrate and to shake the first container to mix the base shampoo and any concentrate therein.

4. The kit of claim 1 wherein the pre-mixed base shampoo comprises a base shampoo containing a detergent cleanser.

5. The kit of claim 1 wherein the pre-mixed medicated concentrate is selected from the group consisting of sulfur medicaments, salicylic acid, benzoyl peroxide, ethyl lactate/lactic acid, a broad spectrum anti-bacterial and anti-fungal, and a vitamin and oil emollient.

6. The kit of claim 1 wherein the label includes a self-adhesive that adheres to the first container.

7. An apparatus for providing customized treatment of dermatological disturbances of companion animals comprising:

a disposable first container having a removable cap covering an access opening, each first container pre-filled partially with a pre-selected fixed volume of multiple servings for a companion pet animal of a pre-mixed base shampoo;

a plurality of disposable second containers each having an access opening and containing a treatment-effective amount of a pre-mixed medicated concentrate for a dermatological condition, each second container holding a different pre-mixed medicated concentrate including a pre-selected amount of one or more active ingredients which acts upon a dermatological skin or hair condition of a companion pet animal; and each second container including a disposable mechanism to dispense pre-determined and consistent doses of the concentrate and a mechanism to transfer a dose to said first container, the mechanism comprising a manually operated pump which dispenses from a nozzle approximately the same volume of concentrate per pumping action of the pump to produce fixed doses of the concentrate of generally pre-known concentration and uniform size that can be added to a first container through an access opening;

the concentration of each active ingredient of each concentrate being pre-correlated with the volume of shampoo in each first container, the relevant dermatological condition, and the fixed volume of the doses from the pump so that the user can infect fixed volume doses of one or more concentrates from the second containers into the fixed volume of shampoo in the first container and create a custom, medicated shampoo for a selected dermatological condition without having to measure a volume of concentrate or shampoo.

8. The apparatus of claim 7 further comprising a holder for the second containers, said holder including indicia identifying each second container by a symbol other than descriptive of the contents of the second container.

9. The apparatus of claim 8 further comprising a label attached to the first container including the symbol identifying the second container.

10. A kit for creating a customized mixture of base shampoo and one or more concentrates, each concentrate selected to act upon a diagnosed dermatological skin or hair condition in a companion pet animal comprising:

a plurality of disposable first containers partially filled with a pre-selected fixed volume of multiple servings for a companion pet animal of a pre-mixed base shampoo and having a removable cap covering an access opening to allow access to the shampoo contained therein;

a plurality of disposable second containers each having an access opening and each holding a pre-mixed concentrate which acts upon a dermatological skin or hair condition of a companion pet animal, each second container holding a different pre-mixed medicated concentrate including a pre-selected amount of one or more active ingredients which acts upon a dermatological skin or hair condition of a companion pet animal;

a disposable dispensing mechanism extending from the second container, the dispensing mechanism including a component to produce doses of the concentrate of generally uniform size that can be added to the first container through the access opening, the component comprising a manually operated pump which dispenses from a nozzle approximately the same volume of concentrate per pumping action of the pump to produce fixed doses of the concentrate of generally pre-known concentration and uniform size that can be added to a first container through an access opening;

a container holder including receivers for the second containers;

a set of instructions and information for use with said kit, said instructions and information being correlated with the parts in the kit to allow users of the kit to select the correct dosage of concentrate to act with the pre-mixed base shampoo; and a label having portions which can be written upon and which can be mounted upon a first container after said one or more concentrates have been added to the pre-mixed base shampoo, to identify the contents of the first container;

the concentration of each active ingredient of each concentrate being pre-correlated with the volume of shampoo in each first container, the relevant dermatological condition, and the fixed volume of the doses from the pump so that the user can inject fixed volume doses of one or more concentrates from the second containers into the fixed volume of shampoo in the first container and create a custom, medicated shampoo for a selected dermatological condition without having to measure a volume of concentrate or shampoo.

11. A kit for creating a customized mixture of base shampoo and one or more concentrates, each concentrate selected to act upon a diagnosed dermatological skin or hair condition in a companion pet animal comprising:

a plurality of disposable first containers partially filled with a pre-selected fixed volume of multiple servings for a companion pet animal of a pre-mixed base shampoo and having a removable cap covering an access opening to allow access to the shampoo contained therein;

a holder for said plurality of first containers, including an interior for holding and storing said first containers and a mechanism to automatically deliver successive first containers to a user access position;

a plurality of disposable second containers each having an access opening and each holding a pre-mixed concentrate which acts upon a dermatological skin or hair condition of a companion pet animal, each second container holding a different pre-mixed medicated concentrate including a pre-selected amount of one or more active ingredients which acts upon a dermatological skin or hair condition of a companion pet animal;

a disposable dispensing mechanism extending from each second container, the dispensing mechanism including a component to produce doses of the concentrate of generally uniform size that can be added to the first container through the access opening, the component comprising a manually operated pump which dispenses from a nozzle approximately the same volume of concentrate per pumping action of the pump to produce fixed doses of the concentrate of generally pre-known concentration and uniform size that can be added to a first container through an access opening;

a container holder including receivers for a plurality of second containers;

a set of instructions and information for use with said kit, said instructions and information being correlated with the parts in the kit to allow users of the kit to select the correct dosage of concentrate to act with the pre-mixed base shampoo; and a label having portions which can be written upon and which can be mounted upon a first container after said one or more concentrates have been added to the pre-mixed base shampoo, to identify the contents of the first container;

the concentration of each active ingredient of each concentrate being pre-correlated with the volume of shampoo in each first container, the relevant dermatological condition, and the fixed volume of the doses from the pump so that the user can inject fixed volume doses of one or more concentrates from the second containers into the fixed volume of shampoo in the first container and create a custom, medicated shampoo for a selected dermatological condition without having to measure a volume of concentrate or shampoo.

* * * * *